(12) United States Patent
Tojima et al.

(10) Patent No.: US 9,836,061 B2
(45) Date of Patent: Dec. 5, 2017

(54) MANAGEMENT SYSTEM AND MANAGING METHOD OF MINING MACHINE

(71) Applicant: Komatsu Ltd., Tokyo (JP)

(72) Inventors: Masanori Tojima, Fujisawa (JP); Mitsuhiro Ryuman, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/106,902

(22) PCT Filed: Dec. 27, 2013

(86) PCT No.: PCT/JP2013/085258
§ 371 (c)(1),
(2) Date: Jun. 21, 2016

(87) PCT Pub. No.: WO2015/097907
PCT Pub. Date: Jul. 2, 2015

(65) Prior Publication Data
US 2016/0349753 A1    Dec. 1, 2016

(51) Int. Cl.
*G05D 1/00* (2006.01)
*G01S 13/06* (2006.01)
*G01S 19/48* (2010.01)
*G05D 1/02* (2006.01)

(52) U.S. Cl.
CPC .............. *G05D 1/027* (2013.01); *G01S 13/06* (2013.01); *G01S 19/48* (2013.01); *G05D 1/0261* (2013.01); *G05D 2201/021* (2013.01)

(58) Field of Classification Search
CPC .......... G05D 1/00; G05D 1/027; G01S 13/00; G01S 13/06; G01S 13/08
See application file for complete search history.

(56) References Cited

U.S. PATENT DOCUMENTS 6,292,725 B1    9/2001   Kageyama et al.
6,751,535 B2    6/2004   Mori

FOREIGN PATENT DOCUMENTS

JP      2002-215236 A    7/2002
WO     WO-98/45765 A1    10/1998

OTHER PUBLICATIONS

International Search Report dated Feb. 25, 2014, issued for PCT/JP2013/085258.

*Primary Examiner* — Yonel Beaulieu
(74) *Attorney, Agent, or Firm* — Locke Lord LLP

(57) ABSTRACT

A managing method of a mining machine includes: detecting a position of a landmark; and extending a first distance when a position of the landmark obtained in advance is present within a range of a second distance in a travel direction of the mining machine from a position, as a reference, where the mining machine reaches when the mining machine travels the first distance after the mining machine starts traveling by the dead reckoning navigation, when the mining machine travels in an unmanned state in a mine in which a plurality of the landmarks is located, the mining machine travels based on a detected self position and uses the dead reckoning navigation while correcting a current position of the mining machine based on a position of the landmark obtained in advance and a detected position of the landmark when the self position cannot be detected.

11 Claims, 11 Drawing Sheets

MANAGEMENT SYSTEM AND MANAGING METHOD OF MINING MACHINE

CROSS REFERENCE TO RELATED APPLICATIONS

This application is related to two co-pending applications: pending "MINING MACHINE MANAGEMENT SYSTEM AND MANAGEMENT METHOD" filed on Jun. 22, 2016, U.S. Ser. No. 15/107,185, in the names of Masanori TOJIMA and Mitsuhiro RYUMAN as a national phase entry of PCT/JP2013/085256 filed Dec. 27, 2013 and pending "MINING MACHINE MANAGEMENT SYSTEM, MINING MACHINE, AND MANAGEMENT METHOD" filed on Jun. 22, 2016, U.S. Ser. No. 15/107,198, in the names of Masanori TOJIMA and Mitsuhiro RYUMAN as a national phase entry of PCT/JP2013/085264 filed Dec. 27, 2013, which application is assigned to the assignee of the present application and is incorporated by reference herein.

FIELD

The present invention relates to a management system and a managing method of a mining machine.

BACKGROUND

In a mine, it is suggested to allow an unmanned vehicle to automatically travel along a travel route set in advance (for example, Patent Literature 1).

CITATION LIST

Patent Literature

Patent Literature 1: Japanese Laid-open Patent Publication No. 2002-215236

SUMMARY

Technical Problem

Patent Literature 1 discloses using navigation to obtain a travel distance of a vehicle by using a speed sensor or a movement distance sensor and estimate a direction by using a gyroscope or a geomagnetic sensor, thereby estimating a position and a direction of the vehicle when allowing the unmanned vehicle to automatically travel. When the mining machine is allowed to travel by such navigation, an error of an estimated position of the mining machine and the like becomes larger as the travel distance becomes longer. Therefore, when the mining machine is allowed to travel by the above-described navigation, it is considered to correct the error of the estimated position and the like by using a GPS or a reference of a position referred to as a landmark located in the mine.

When the GPS and the landmark cannot be used, the mining machine is allowed to travel by using only the above-described navigation. In this case, as described above, the error of the estimated position of the mining machine and the like becomes larger as the travel distance becomes longer, so that the distance traveled by using only the above-described navigation is limited. A driving state of the mining machine is controlled so as not to go beyond the limitation. In this manner, operation stop time of the mining machine occurs, so that productivity in the mine might be deteriorated.

An object of the present invention is to provide the management system and the managing method of the mining machine capable of inhibiting the deterioration in the productivity in the mine.

Solution to Problem

According to the present invention, a management system of a mining machine comprises: a detecting unit mounted on the mining machine which travels in an unmanned state in a mine in which a plurality of landmarks is located, the detecting unit detecting a position of a landmark relative to the mining machine in a contactless manner; a travel control unit which corrects a current position of the mining machine based on a position of the landmark obtained in advance and the position of the landmark obtained by the detecting unit and allows the mining machine to travel by dead reckoning navigation; a travel limiting unit which stops the mining machine when the mining machine travels a first distance after starting traveling by the dead reckoning navigation; and a travel limitation relaxing unit which extends the first distance when the position of the landmark obtained in advance is present within a range of a second distance in a travel direction of the mining machine from a position, as a reference, where the mining machine reaches when the mining machine travels the first distance after the mining machine starts traveling by the dead reckoning navigation.

It is preferable that the management system of the mining machine comprises: a self position detection device mounted on the mining machine which obtains a self position of the mining machine, wherein the travel control unit allows the mining machine to travel by using at least the self position detected by the self position detection device and allows the mining machine to travel by the dead reckoning navigation when the self position detection device becomes unable to detect the self position.

It is preferable that the travel limiting unit makes a position where the self position detection device becomes unable to detect the self position a position where the mining machine starts traveling by the dead reckoning navigation.

It is preferable that the travel control unit decreases a speed of the mining machine as compared with the speed before the dead reckoning navigation is used when the mining machine is allowed to travel by using the dead reckoning navigation.

It is preferable that the travel control unit increases a decreasing amount of the speed of the mining machine according to travel time or a travel distance of the mining machine when the mining machine is allowed to travel by using the dead reckoning navigation.

It is preferable that the travel control unit increases the speed of the mining machine when the detecting unit detects the position of the landmark when allowing the mining machine to travel by using the dead reckoning navigation.

It is preferable that the travel limitation relaxing unit changes an amount by which the first distance is extended according to an error of the position of the mining machine occurring by the dead reckoning navigation.

It is preferable that the travel limitation relaxing unit sets an amount by which the first distance is extended according to a configuration of a conveyance path along which the mining machine travels.

It is preferable that the travel limitation relaxing unit changes an amount by which the first distance is extended according to a current position of the mining machine on a conveyance path along which the mining machine travels.

According to the present invention, a management system of a mining machine comprises: a detecting unit mounted on the mining machine which travels in an unmanned state in a mine in which a plurality of landmarks is located, the detecting unit detecting a position of a landmark relative to the mining machine in a contactless manner; a self position detection device mounted on the mining machine which obtains a self position of the mining machine; a travel control unit mounted on the mining machine which allows the mining machine to travel by using at least the self position detected by the self position detection device, and corrects a current position of the mining machine based on a position of the landmark obtained in advance and the position of the landmark obtained by the detecting unit when the self position detection device becomes unable to detect the self position to allow the mining machine to travel by dead reckoning navigation; a travel limiting unit mounted on the mining machine which stops the mining machine when the mining machine travels a first distance after starting traveling by the dead reckoning navigation; and a travel limitation relaxing unit mounted on the mining machine which extends the first distance when the position of the landmark obtained in advance is present within a range of a second distance in a travel direction of the mining machine from a position, as a reference, where the mining machine reaches when the mining machine travels the first distance after the mining machine starts traveling by the dead reckoning navigation.

According to the present invention, a managing method of a mining machine comprises: detecting a position of a landmark; and extending a first distance when a position of the landmark obtained in advance is present within a range of a second distance in a travel direction of the mining machine from a position, as a reference, where the mining machine reaches when the mining machine travels the first distance after the mining machine starts traveling by the dead reckoning navigation, when the mining machine travels in an unmanned state in a mine in which a plurality of the landmarks is located, the mining machine travels based on a detected self position and uses the dead reckoning navigation while correcting a current position of the mining machine based on a position of the landmark obtained in advance and a detected position of the landmark when the self position cannot be detected.

The present invention may inhibit the deterioration in the productivity in the mine.

DESCRIPTION OF EMBODIMENTS

A mode for carrying out the present invention (embodiment) is described in detail with reference to the drawings.

<Overview of Management System of Mining Machine>

Figure 1:
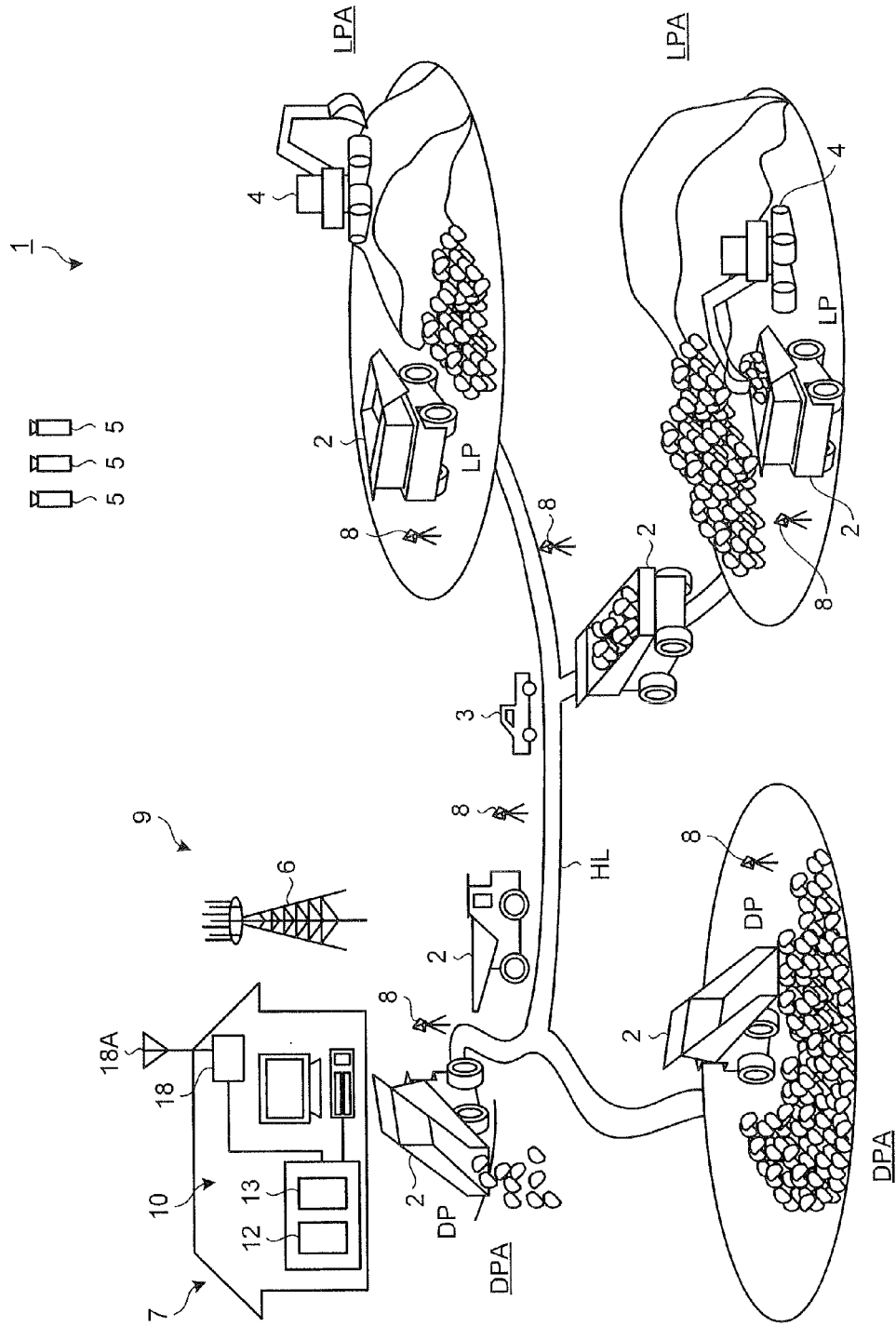
FIG. 1 is a view illustrating an example of a management system of a mining machine according to this embodiment.

FIG. 1 is a view illustrating an example of a management system 1 of a mining machine according to this embodiment. FIG. 1 schematically illustrates the management system of the mining machine (hereinafter, appropriately referred to as management system) 1 and a site where the management system 1 is applied. The management system 1 including a management device 10 arranged in a control facility 7 manages the mining machine. Management of the mining machine includes at least one of operation management of the mining machine, evaluation of productivity of the mining machine, evaluation of operation technology of an operator of the mining machine, maintenance of the mining machine, and anomaly diagnosis of the mining machine.

The mining machine is a collective term of machinery used in various operations in a mine. The mining machine includes a loading machine, a transporting machine and the like, for example. The loading machine is a machine which loads the transporting machine with a load such as earth and sand or rocks. The loading machine includes at least one of a hydraulic excavator, an electric excavator, and a wheel loader. The transporting machine is a machine which travels in the mine to transport the load loaded by the loading machine. The transporting machine includes a dump truck 2.

In this embodiment, the management system 1 manages at least the transporting machine. Although an example in which the management system 1 manages the dump truck 2 is hereinafter described, a target managed by the management system 1 is not limited to the dump truck 2. The dump truck 2 travels across at least a part of a loading site LPA in the mine, an earth discharging site DPA, and a conveyance path HL as a travel path leading to at least one of the loading site LPA and the earth discharging site DPA. In this manner, the dump truck 2 is a moving body movable in the mine.

In this embodiment, the dump truck 2 is a so-called unmanned dump truck operated by an instruction from the management device 10. Therefore, a worker (driver) does not get in the dump truck 2. In this embodiment, the dump truck 2 travels along a travel route determined in advance. In this embodiment, the dump truck 2 controls a steering, an accelerator, and a brake thereof so as to follow a set travel route based on it's own position (self position) during operation and positional information included in the above-described travel route.

The dump truck 2 is loaded with the load by a loading machine 4 at a loading position LP in the loading site LPA. The loading site LPA is an area where loading operation of the load is performed in the mine. The loading position LP is a position (loading point) where the dump truck 2 is actually loaded with the load in the loading site LPA spreading in a predetermined range.

The load of the dump truck 2 is unloaded in the earth discharging site DPA. Specifically, the dump truck 2 lifts a vessel loaded with the load to discharge the load from the vessel on the earth discharging site DPA. The earth discharging site DPA is an area where the dump truck 2 discharges the load in the mine. An earth discharging position DP is a place where the dump truck 2 actually discharges the load in the earth discharging site DPA spreading in a predetermined range.

In this embodiment, the management system 1 illustrated in FIG. 1 includes at least the dump truck 2. In this embodiment, the management system 1 may also be realized by the dump truck 2 and the management device 10 arranged in the control facility 7 to manage the dump truck 2.

In the mine, a vehicle 3 as a moving body movable in the mine travels in addition to the dump truck 2. The vehicle 3 travels in the mine so as to perform the various operations regarding the mine including the management and maintenance of the mining machine used in the mine. In this embodiment, the vehicle 3 travels across at least a part of the loading site LPA, the earth discharging site DPA, and the conveyance path HL. The vehicle 3 is driven by a worker (driver) who gets in the same. In this manner, the vehicle 3 is a so-called manned vehicle. The worker who gets in the vehicle 3 moves to an arbitrary position in the mine together with the vehicle 3. In this embodiment, the vehicle 3 is a pick-up truck or a passenger vehicle, for example.

The management device 10 is located in the control facility (or central control room) 7 of the mine. Although the management device 10 does not move in this embodiment, the management device 10 may move.

A plurality of landmarks 8 is located in the mine. The landmark 8 is arranged on each of the loading site LPA, the earth discharging site DPA, and the conveyance path HL. The landmark 8 is a stationary object, so that this does not move from a position (place) where this is located in principle.

The dump truck 2 travels while sequentially updating the self position thereof by using azimuthal measurement with a gyroscope and a speed at which the dump truck 2 travels (hereinafter, appropriately referred to as vehicle speed). Such a method is referred to as dead reckoning navigation or autonomous navigation. Errors are accumulated in the dead reckoning navigation. Therefore, in the dead reckoning navigation, the self position is corrected by using the position of the dump truck positioned by using a GPS (global positioning system), for example. The dump truck 2 obtains the position of the landmark 8 to correct the self position when the GPS cannot be used. Meanwhile, the self position may also be corrected by the management device 10.

A communication system 9 transmits information between the management device 10 and the dump truck 2 and between the management device 10 and the vehicle 3. Therefore, the management device 10 may communicate with the dump truck 2 and the vehicle 3 through the communication system 9. In this embodiment, the communication system may also transmit the information between the vehicle 3 and the dump truck 2. In this case, the dump truck 2 and the vehicle 3 may communicate with each other through the communication system 9. In this embodiment, although the communication system 9 is a wireless communication system, there is no limitation. In this embodiment, the communication system 9 includes a relay device 6 which relays a signal (radio wave) between the management device 10 and the dump truck 2 and vehicle 3.

In this embodiment, the position of the dump truck 2, the position of the vehicle 3, and the position of the landmark 8 are obtained by using the GPS. The GPS includes a GPS satellite 5. The GPS detects a position in a coordinate system (GPS coordinate system) which defines latitude, longitude, and altitude. Therefore, the position detected by the GPS includes coordinate values of the latitude, longitude, and altitude. The position detected by the GPS is an absolute position defined in the GPS coordinate system. In the following description, the position positioned by the GPS is appropriately referred to as a GPS position.

<Management Device>

Figure 2:
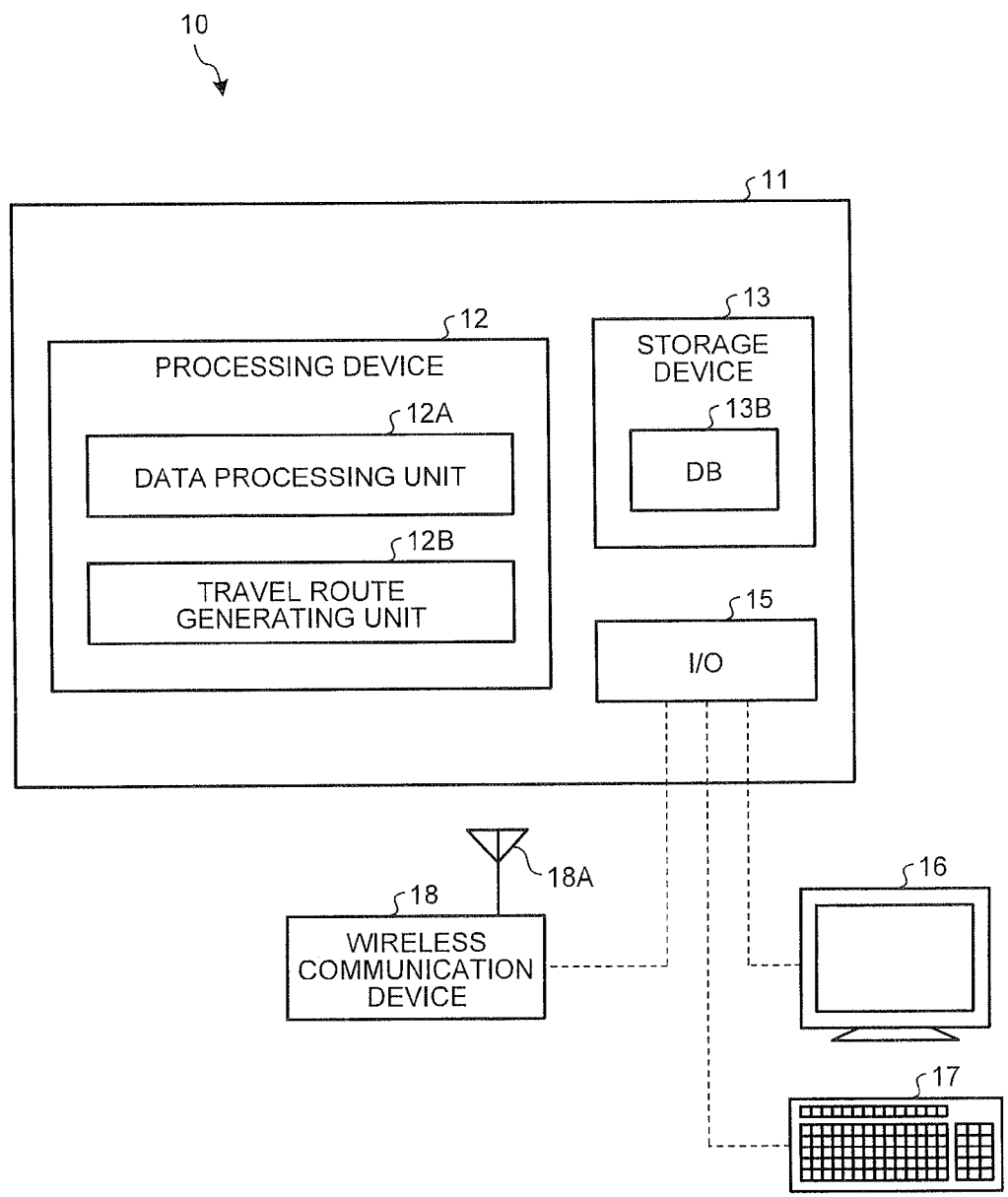
FIG. 2 is a block diagram illustrating an example of a management device according to this embodiment.

FIG. 2 is a block diagram illustrating an example of the management device 10 according to this embodiment. As illustrated in FIG. 2, the management device 10 is provided with a computer system 11, a display device 16, an input device 17, and a wireless communication device 18. The computer system 11 is provided with a processing device 12 as a processing unit, a storage device 13 as a storage unit, and an input/output unit 15. The display device 16, the input device 17, and the wireless communication device 18 are connected to the computer system 11 through the input/output unit 15. The input/output unit 15 is used for inputting/outputting information between the processing device 12 and at least one of the display device 16, the input device 17, and the wireless communication device 18.

The processing device 12 includes a CPU (central processing unit), for example. The processing device 12 executes various processes regarding the management of the dump truck 2. The processing device 12 includes a data processing unit 12A and a travel route generating unit 12B. In this embodiment, the data processing unit 12A processes information regarding the position of the dump truck 2, information regarding the position of the vehicle 3, and information regarding the position of landmark 8 obtained through the communication system 9. The travel route generating unit 12B generates the travel route along which the dump truck 2 travels. The dump truck 2 travels along the travel route generated by the travel route generating unit 12B in at least a part of the loading site LPA, the earth discharging site DPA, and the conveyance path HL. The travel route generated by the travel route generating unit 12B is a positional information group including a plurality of coordinate values of the latitude, longitude, and altitude as the positional information.

The storage device 13 is a RAM (random access memory), a ROM (read only memory), an EPROM (erasable programmable read only memory), an EEPROM (electrically erasable programmable read-only memory) or a hard disk drive or combination of them. The storage device 13 stores various pieces of information regarding the management of the dump truck 2. The storage device 13 includes a database 13B in which the information is registered. The storage device 13 stores a computer program for allowing the processing device 12 to execute the various processes.

The processing device 12 reads the computer program stored in the storage device 13 to process the information regarding the position and generate the travel route.

The display device 16 displays the information regarding the position of the dump truck 2, the information regarding the position of the vehicle 3, the information regarding the position of the landmark 8 and the like. The display device 16 includes a flat panel display such as a liquid crystal display, for example.

The input device 17 includes at least one of a keyboard, a touch panel, an operating switch, and a mouse. The input device 17 serves as an operating unit capable of inputting an operation signal to the processing device 12. A manager of the control facility 7 may operate the input device 17 to input an instruction, the information and the like to the processing device 12.

The communication system 9 includes the wireless communication device 18. The wireless communication device 18 is arranged in the control facility 7. The wireless communication device 18 is connected to the processing device 12 through the input/output unit 15. The wireless communication device 18 includes an antenna 18A. The wireless communication device 18 may receive the information transmitted from at least one of the dump truck 2 and the vehicle 3. The wireless communication device 18 outputs the received information to the processing device 12. The information received by the wireless communication device 18 is stored (registered) in the storage device 13. The wireless communication device 18 transmits the information to at least one of the dump truck 2 and the vehicle 3.

<Dump Truck>

Figure 3:
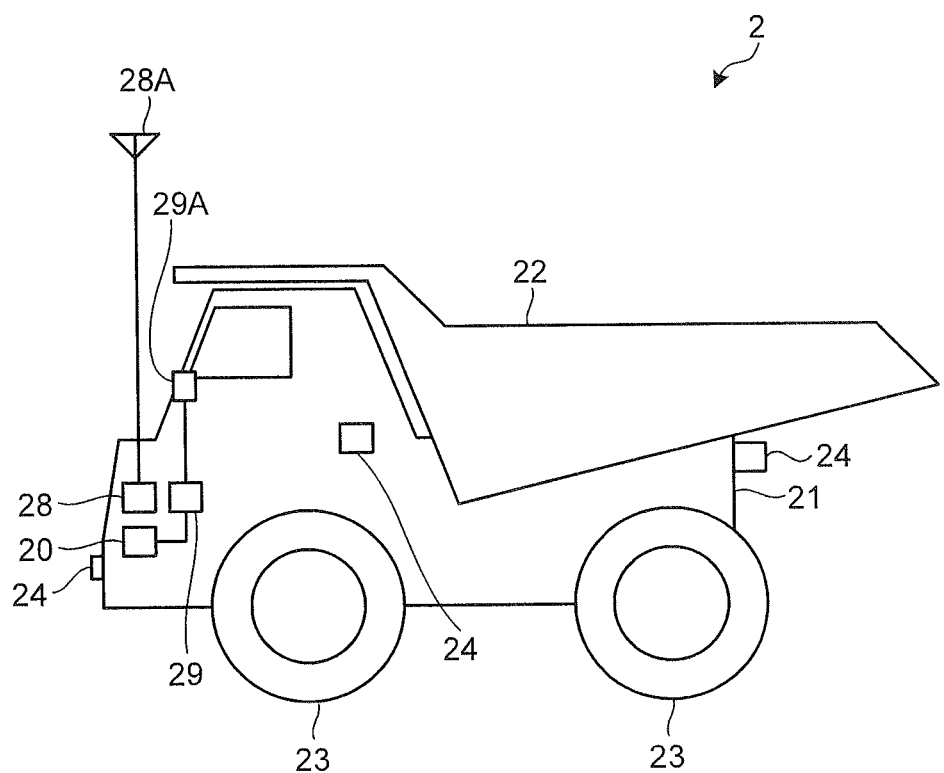
FIG. 3 is a view illustrating a dump truck according to this embodiment.
Figure 4:
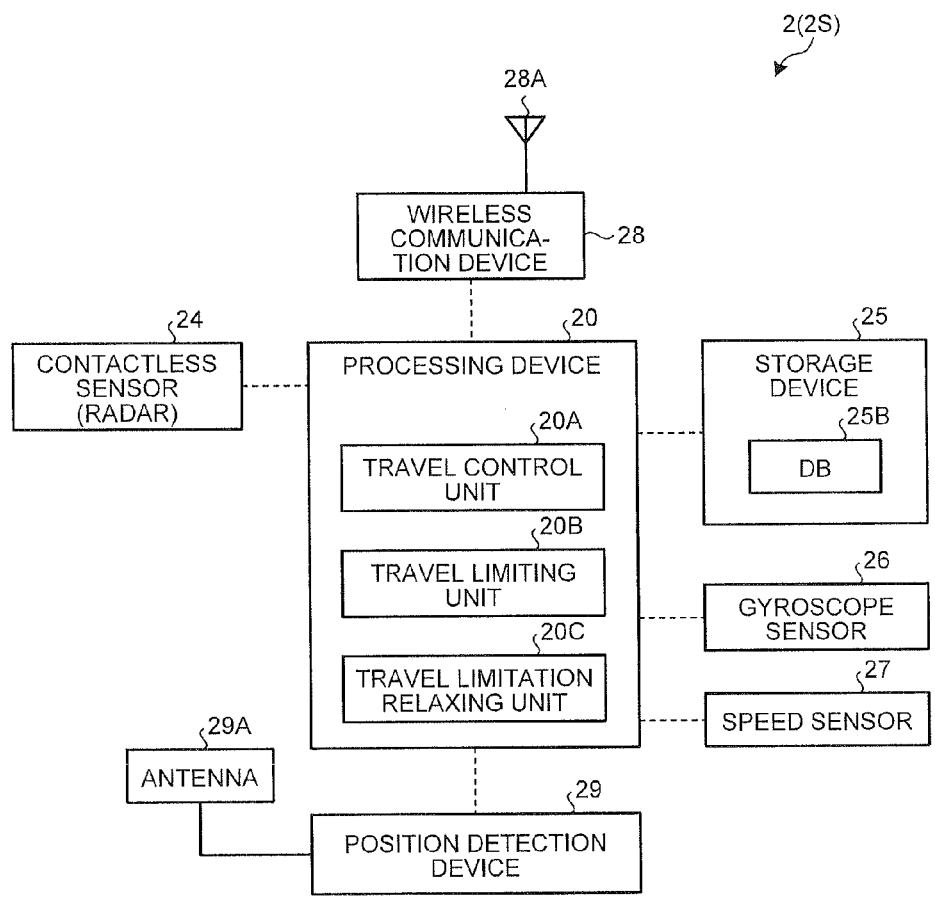
FIG. 4 is a block diagram illustrating a control system of the dump truck according to this embodiment.

FIG. 3 is a view illustrating the dump truck 2 according to this embodiment. FIG. 4 is a block diagram illustrating a control system of the dump truck 2 according to this embodiment. As illustrated in FIGS. 3 and 4, the dump truck 2 is provided with a vehicle main body 21, a vessel 22, a wheel 23, a contactless sensor 24 as a detecting unit which detects the position of the landmark 8 in a contactless manner, a processing device 20 as a processing unit, a storage device 25 as a storage unit, a gyroscope sensor 26, a speed sensor 27, a wireless communication device 28 to which an antenna 28A is connected, and a position detection device 29 as a self position detection device to which an antenna 29A is connected.

An internal combustion engine, a generator, and a motor are mounted on the vehicle main body 21, for example. In this embodiment, the internal combustion engine is a diesel engine, for example. The generator is driven by the internal combustion engine to generate power. The motor drives the wheel 23, more specifically, a rear wheel by the power generated by the generator to allow the dump truck 2 to travel. The wheel 23 includes a tire and a wheel. A drive system of the dump truck 2 is not limited to such a system. For example, the drive system of the dump truck 2 may also be the drive system in which the power of the internal combustion engine is transmitted to the wheel 23 through a transmission including a torque converter.

The vessel 22 is a loading platform on which the load is loaded. The vessel 22 is arranged on an upper side of the vehicle main body 21. The vessel 22 is loaded with the load by the loading machine 4. The vessel 22 may take a horizontal first attitude and a second attitude lifted with a rear end side of the dump truck 2 as a fulcrum. The first attitude is a state in which the vessel 22 is loaded with the load and the second attitude is the attitude in which load is unloaded from the vessel 22.

A plurality of contactless sensors 24 is arranged around the vehicle main body 21. The contactless sensor 24 is provided with a radar device which detects an object which is present around the dump truck 2, for example. The radar device included in the contactless sensor 24 is a device which detects the object in a contactless manner by using millimeter wave radar, for example. In this embodiment, the contactless sensor 24 may obtain a distance to the detected object and a direction of the object and may obtain a relative position between the same and the detected object from the obtained distance and direction.

The contactless sensor 24 may also output a signal according to reflection intensity of a radio wave reflected by the object and a direction of the reflected radio wave. In this case, the processing device 20 which obtains the signal from the contactless sensor 24 obtains the distance to the object detected by the contactless sensor 24 and the direction of the object based on the reflection intensity and the direction of the radio wave corresponding to the obtained signal and obtains the relative position between the detected object and the contactless sensor 24 from the obtained distance and direction. That is to say, the contactless sensor 24 and the processing device 20 serve as the detecting unit.

The contactless sensor 24 includes an emitting unit capable of emitting the radio wave and a receiving unit capable of receiving the radio wave. In this embodiment, the position of the landmark 8 located in the mine is detected in a contactless manner by using the contactless sensor 24 used for monitoring the periphery of the dump truck 2. In this manner, it is not required to separately provide sensors for detecting the position of the landmark 8, so that a manufacturing cost of the dump truck 2 may be decreased.

The contactless sensor 24 emits the radio wave to irradiate the landmark 8 when detecting the landmark 8 and the position thereof. At least a part of the radio wave with which the landmark 8 is irradiated is reflected by the landmark 8. The contactless sensor 24 receives the radio wave reflected by the landmark 8. In this manner, the contactless sensor 24 may detect the landmark 8 relative to the contactless sensor 24 and detect the direction of the detected landmark 8, the distance thereto, and the position thereof.

The contactless sensor 24 is attached to the vehicle main body 21 of the dump truck 2. Therefore, the relative position of the landmark 8 with respect to the dump truck 2 detected by the contactless sensor 24 corresponds to the position of the landmark 8 with respect to the dump truck 2 (relative position, hereinafter appropriately referred to as relative position).

The contactless sensor 24 is connected to the processing device 20. The contactless sensor 24 converts a detection result obtained by detecting the landmark 8 or the vehicle and other objects which is present around the dump truck 2 to an electric signal to output to the processing device 20. The detection result includes the direction of the landmark 8, the distance thereto, and the position thereof. The processing device 20 obtains the relative position between the dump truck 2 and the landmark 8 based on the detection result of the contactless sensor 24. That is to say, the contactless sensor 24 detects the relative position of the landmark 8 with respect to the same, thereby detecting the relative position between the dump truck 2 and the landmark 8.

The contactless sensor 24 is arranged on each of a front surface, a rear surface, and both side surfaces of the vehicle main body of the dump truck 2. In the embodiment to be described below, an object in front (for example, the landmark 8) is detected at the time of travel substantially straight, so that an example in which the contactless sensor 24 on the front surface is used is described. At the time of rearward movement, the object may be detected by the contactless sensor 24 on the rear surface. The object located short of a curve may also be detected by the contactless sensor 24 on the side surface. Each contactless sensor 24 obtains at least one of the distance to the object and the direction thereof. The processing device 20 detects the relative position between the dump truck 2 and the object in consideration of the detection result of each contactless sensor 24 and an attaching position and an attaching direction of each contactless sensor 24 on the vehicle main body.

The gyroscope sensor 26 detects the direction (for example, directional change amount) of the dump truck 2. The gyroscope sensor 26 connected to the processing device 20 converts a detection result to an electric signal to output to the processing device 20. The processing device 20 obtains the direction (directional change amount) of the dump truck 2 based on the detection result of the gyroscope sensor 26.

The speed sensor 27 detects the vehicle speed of the dump truck 2. In this embodiment, the speed sensor 27 detects a rotational speed of the wheel 23 to detect the vehicle speed of the dump truck 2. The speed sensor 27 connected to the processing device 20 converts a detection result to an electric signal to output to the processing device 20. The processing device 20 may obtain a movement distance of the dump truck 2 based on the detection result of the speed sensor 27 and time information from a timer embedded in the processing device 20.

<Control System of Dump Truck>

The processing device 20 included in a processing system 2S of the dump truck 2 illustrated in FIG. 4 includes a CPU (central processing unit). The processing device 20 executes various processes regarding the management, control and the like of the dump truck 2. In this embodiment, the processing device 20 may also execute the processes equivalent to those of the processing device 12 arranged in the control facility 7. The processing device 20 includes a travel control unit 20A, a travel limiting unit 20B, and a travel limitation relaxing unit 20C.

The travel control unit 20A allows the dump truck 2 to travel along the travel route set in advance based on the self position of the dump truck 2 detected by the position detection device 29 as the self position detection device. In this case, the travel control unit 20A controls at least one of the steering, the accelerator, and the brake of the dump truck 2 to control a travel state of the dump truck 2. When the position detection device 29 becomes unable to detect the self position of the dump truck 2, the travel control unit 20A allows the dump truck 2 to travel by the dead reckoning navigation.

The travel limiting unit 20B stops the dump truck 2 when the dump truck 2 travels a first distance after starting traveling by the dead reckoning navigation. The travel limitation relaxing unit 20C extends the first distance when the position of the landmark 8 obtained in advance is present within a range of a second distance in a travel direction of the dump truck 2 from a position as a reference where the dump truck 2 reaches after traveling the first distance after starting traveling by the dead reckoning navigation. The processes executed by the travel control unit 20A, the travel limiting unit 20B, and the travel limitation relaxing unit 20C are described later in detail.

The storage device 25 included in the processing system 2S is connected to the processing device 20. According to such a structure, the processing device 20 and the storage device 25 may exchange information with each other. The storage device 25 is a RAM (random access memory), a ROM (read only memory), an EPROM (erasable programmable read only memory), an EEPROM (electrically erasable programmable read-only memory) or a hard disk drive or combination of them. The storage device 25 stores various pieces of information regarding the management of the dump truck 2. The information stored in the storage device 25 includes a computer program and the like for allowing a database 25B in which the information used for controlling the dump truck 2 is registered and the processing device 20 to execute the various processes. In this embodiment, the storage device 25 may store the information equivalent to that of the storage device 13 arranged in the control facility 7.

The wireless communication device 28 included in the processing system 2S is an in-vehicle communication device mounted on the dump truck 2 to perform wireless communication. The wireless communication device 28 includes the antenna 28A. The wireless communication device 28 is connected to the processing device 20. The wireless communication device 28 receives the information including an instruction signal transmitted from at least one of the management device 10 and the vehicle 3. The information received by the wireless communication device 28 is output to the processing device 20 or stored in the storage device 25 through the processing device 20. The processing device 20, more specifically, the travel control unit 20A may control the travel of the dump truck 2 according to the instruction signal received by the wireless communication device 28. The wireless communication device 28 may transmit the information output by the processing device 20 to at least one of the management device 10 and the vehicle 3. That is to say, the processing device 20 may transmit/receive the information to/from at least one of the management device 10 and the vehicle 3 through the wireless communication device 28.

The position detection device 29 included in the processing system 2S is mounted on the dump truck 2. The position detection device 29 is connected to the processing device 20. The position detection device 29 includes a GPS receiver and a GPS antenna 29A. The antenna 29A is arranged outside the dump truck 2, a position where a radio wave from the GPS satellite 5 illustrated in FIG. 1 is easily received.

The position detection device 29 obtains the self position of the dump truck 2 by using the GPS. The self position obtained by the position detection device 29 is the position of the dump truck 2 obtained by the GPS, that is to say, the GPS position and absolute position. The self position obtained by the position detection device 29 is more specifically the GPS position of the antenna 29A attached to the dump truck 2. In this embodiment, the GPS position of the antenna 29A is made the self position of the dump truck 2. The processing device 20 illustrated in FIG. 4 may obtain a position of each unit of the dump truck 2 and obtain the position of the landmark 8 relative to the dump truck 2 detected by the contactless sensor 24 based on the self position.

The antenna 29A receives the radio wave from the GPS satellite 5. The antenna 29A outputs a signal based on the received radio wave to the position detection device 29. The position detection device 29 obtains the GPS position of the antenna 29A based on the signal output from the antenna 29A. The GPS position of the antenna 29A is obtained, and according to this, the GPS position of the dump truck 2, that is to say, the self position of the dump truck 2 is obtained.

<Vehicle>

Figure 5:
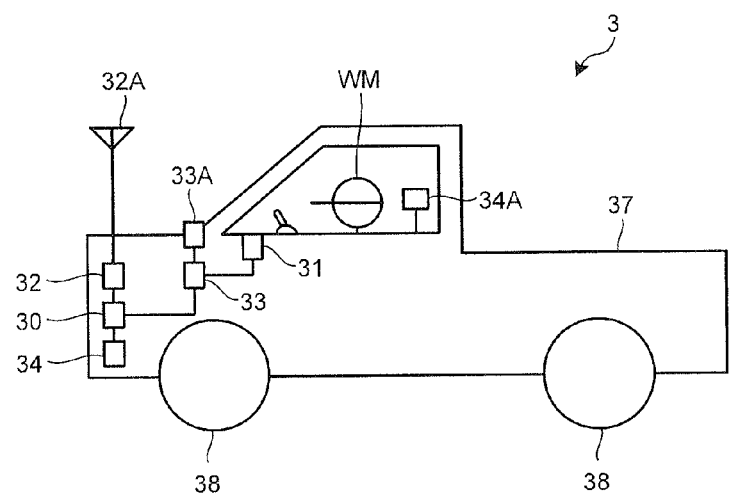
FIG. 5 is a view schematically illustrating an appearance of a vehicle according to this embodiment.
Figure 6:
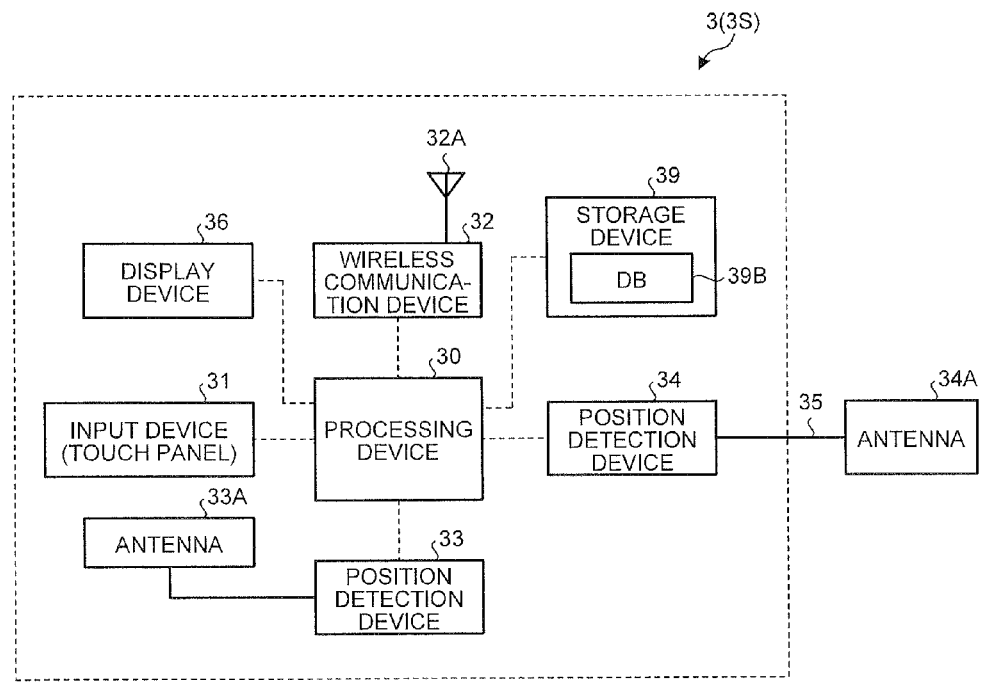
FIG. 6 is a block diagram of a control system of the vehicle according to this embodiment.

FIG. 5 is a view schematically illustrating an appearance of the vehicle 3 according to this embodiment. FIG. 6 is a block diagram of a control system of the vehicle 3 according to this embodiment. As illustrated in FIGS. 5 and 6, the vehicle 3 is provided with a vehicle main body 37, a wheel 38, a processing device 30, a storage device 39, a wireless communication device 32 to which an antenna 32A is connected, a position detection device 33 to which an antenna 33A is connected, a display device 36, and an input device 31.

An internal combustion engine as a generator is mounted on the vehicle main body 37. The wheel 38 rotates by power transmitted from the generator of the vehicle main body 37 to allow the vehicle 3 to travel. In this embodiment, a worker WM who gets in the vehicle 3 operates the vehicle 3.

<Control System 3S of Vehicle 3>

The processing device 30 included in a control system 3S of the vehicle 3 includes a CPU (central processing unit). The processing device 30 to which the storage device 39, the wireless communication device 32, a position detection device 34, the display device 36, and the input device 31 are connected executes various processes. In this embodiment, the processing device 30 may also execute the processes equivalent to those of the processing device 12 arranged in the control facility 7 and the processing device 20 arranged in the dump truck 2.

The storage device 39 included in the control system 3S of the vehicle 3 is mounted on the vehicle 3. The storage device 39 is a RAM (random access memory), a ROM (read only memory), an EPROM (erasable programmable read only memory), an EEPROM (electrically erasable programmable read-only memory) or a hard disk drive or combination of them. The storage device 39 stores a computer program for allowing a database 39B in which information is registered and the processing device 30 to execute the various processes. Meanwhile, the storage device 39 may also store the information equivalent to that in the storage device 13 arranged on the control facility 7 and the storage device 25 arranged on the dump truck 2.

The display device 36 included in the control system 3S of the vehicle 3 may display the information regarding the position of the vehicle 3 and the information regarding the position of the landmark 8. The display device 36 is a flat panel display such as a liquid crystal display, for example, but there is no limitation.

The input device 31 included in the control system 3S of the vehicle 3 includes at least one of a keyboard, a touch panel, and an operating switch. The input device 31 inputs an operation signal to the processing device 30. For example, the worker (driver) WM of the vehicle 3 may operate the input device 31 to input information and input an order to the processing device 30.

The wireless communication device 32 included in the control system 3S of the vehicle 3 is mounted on the vehicle 3. The wireless communication device 32 is connected to the processing device 30. The wireless communication device 32 is provided with the antenna 32A. The wireless communication device 32 receives the information including the instruction signal transmitted from at least one of the management device 10 and the dump truck 2. The information received by the wireless communication device 32 is output to the processing device 30 or stored in the storage device 39 through the processing device 30. The wireless communication device 32 may also transmit the information from the processing device 30 to at least one of the management device 10 and the dump truck 2.

The position detection device 33 included in the control system 3S of the vehicle 3 is mounted on the vehicle 3. The position detection device 33 is connected to the processing device 30. The position detection device 33 includes a GPS receiver and a GPS antenna 33A. The antenna 33A is arranged outside the vehicle 3, a position where the radio wave from the GPS satellite 5 illustrated in FIG. 1 is easily received.

The position detection device 33 obtains the position of the vehicle 3 (hereinafter, appropriately referred to as vehicle position). The vehicle position obtained by the position detection device 33 is the position of the vehicle 3 obtained by the GPS, that is to say, the GPS position and absolute position. The vehicle position obtained by the position detection device 33 is more specifically the GPS position of the antenna 33A attached to the vehicle 3. In this embodiment, the GPS position of the antenna 33A is made the vehicle position. The processing device 30 illustrated in FIG. 6 may obtain a position of each unit of the vehicle 3 based on the vehicle position.

The antenna 33A receives the radio wave from the GPS satellite 5. The antenna 33A outputs a signal based on the received radio wave to the position detection device 33. The position detection device 33 obtains the GPS position of the antenna 33A based on the signal output from the antenna 33A. The GPS position of the antenna 33A is obtained, and according to this, the GPS position of the vehicle 3, that is to say, the vehicle position is obtained.

In this embodiment, a GPS antenna 34A is mounted on the vehicle 3. The antenna 34A receives the radio wave from the GPS satellite 5 illustrated in FIG. 1. The antenna 34A is mounted on the vehicle 3 such that this may be released. The antenna 34A released from the vehicle 3 may be moved to the outside of the vehicle 3, a position away from the vehicle 3. The worker WM may hold the antenna 34A to move the same to the outside of the vehicle 3, the position away from the vehicle 3. In this manner, the antenna 34A may receive the radio wave from the GPS satellite 5 in a state being arranged outside the vehicle 3.

The position detection device 34 included in the control system 3S of the vehicle 3 is mounted on the vehicle 3. The position detection device 34 is connected to the processing device 30. The position detection device 34 includes the GPS receiver and the GPS antenna 34A. The position detection device 34 and the antenna 34A are connected to each other through a cable 35. The position detection device 34 detects a position (GPS position) of the antenna 34A.

When the antenna 34A is carried by the worker WM, the position of the antenna 34A is detected, and according to this, a position (GPS position) of the worker WM is detected. When the antenna 34A is located in the vicinity of an object, the position of the antenna 34A is detected, and according to this, a position (GPS position) of the object is detected.

The antenna 34A outputs a signal based on the radio wave received from the GPS satellite 5 to the position detection device 34 through the cable 35. The position detection device 34 detects the position of the antenna 34A based on the signal obtained from the antenna 34A. The position detection device 34 converts the signal based on the radio wave from the GPS satellite 5 received by the antenna 34A to an electric signal to obtain the position of the antenna 34A. The GPS position of the antenna 34A is obtained, and according to this, the GPS position of the object arranged in the vicinity of the antenna 34A is obtained. The object includes the worker.

<Using Method of Landmark>

Figure 7:
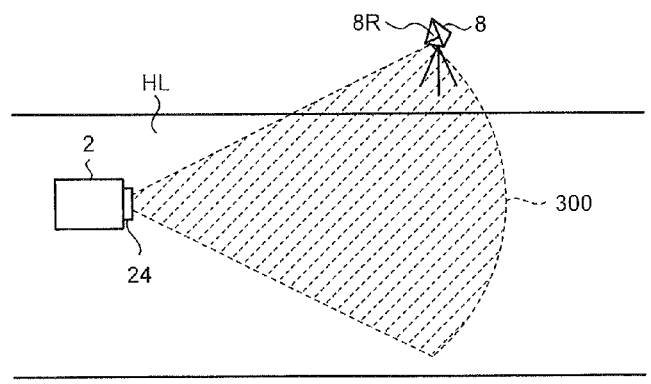
FIG. 7 is a view illustrating an example of a state in which a landmark is detected by a contactless sensor of the dump truck.

FIG. 7 is a view illustrating an example of a state in which the landmark 8 is detected by the contactless sensor 24 of the dump truck 2. The landmark 8 is a structure arranged on each of the loading site LPA, the earth discharging site DPA, and the conveyance path HL. On the conveyance path HL, the landmark 8 is arranged outside the conveyance path HL, for example, on a road shoulder. A plurality of landmarks 8 is arranged at intervals along the conveyance path HL. In this embodiment, the landmark 8 is arranged every 100 m, for example, but the interval between the adjacent landmarks 8 is not limited to 100 m.

The landmark 8 includes a reflecting portion (reflecting surface) 8R capable of reflecting the radio wave emitted from the contactless sensor 24. A reflection ratio (reflection intensity) of the reflecting portion 8R of the landmark 8 with respect to the radio wave is higher than the reflection ratio (reflection intensity) of an object around the landmark 8, for example, the rock and the like of the mine. Therefore, the contactless sensor 24 illustrated in FIG. 4 may detect the landmark 8 in distinction from the object around the same.

As illustrated in FIG. 7, the radio wave is emitted from the emitting unit of the contactless sensor 24 arranged on dump truck 2 to irradiate the landmark 8. At least a part of the radio wave with which the landmark 8 is irradiated is reflected by the reflecting portion 8R of the landmark 8. The contactless sensor 24 receives the radio wave from the landmark 8 reflected by the reflecting portion 8R by the receiving unit. The contactless sensor 24 receives the radio wave from the landmark 8 to detect the landmark 8 itself and detect the relative position between the contactless sensor 24 and the landmark 8, that is to say, the relative position of the landmark 8 with respect to the dump truck 2.

In this embodiment, the radio wave from the contactless sensor 24 propagates so as to be spread from the emitting unit of the contactless sensor 24. Since the landmark 8 is present in a space where the radio wave emitted from the contactless sensor 24 propagates (propagation space), the contactless sensor 24 may detect the landmark 8 itself and the position thereof. The radio wave emitted from the contactless sensor 24 is attenuated as this travels, so that intensity of the radio wave emitted from the contactless sensor 24 lowers as this travels. Since the landmark 8 is present in the propagation space where the radio wave emitted from the contactless sensor 24 propagates in a state of maintaining the intensity of a predetermined value or more, the contactless sensor 24 may detect the landmark 8 itself and the position thereof. Hereinafter, the propagation space of the radio wave where the contactless sensor 24 may detect the landmark 8 itself and the position thereof based on the radio wave emitted therefrom is appropriately referred to as a detection area (detection space) 300 of the contactless sensor 24. A dimension in the travel direction of the detection area 300 which is present in the travel direction of the dump truck 2 is 50 m, for example, but there is no limitation.

The contactless sensor 24 may also be an optical sensor which detects the landmark 8 by using laser light as detection light, for example. In this case, the contactless sensor 24 includes an emitting unit capable of emitting the detection light and a light receiving unit capable of receiving at least a part of the detection light emitted from the emitting unit to be reflected by the landmark 8, for example. Since the landmark 8 is arranged in the space (irradiation space) irradiated with the detection light emitted from the contactless sensor 24, the contactless sensor 24 may detect the landmark 8. When the contactless sensor 24 detects the landmark 8 by using the detection light, the detection area 300 of the contactless sensor 24 includes the irradiation space of the detection light capable of detecting the landmark 8 based on the detection light emitted from the contactless sensor 24.

In this embodiment, the position of the landmark 8 is detected also by using the GPS. The position of the landmark 8 detected by using the GPS is the GPS position and absolute position. In this embodiment, the position of the landmark 8 detected by using the GPS to be obtained in advance, that is to say, the GPS position is stored in the storage device 13 of the management device 10 illustrated in FIG. 2. The GPS position of the landmark 8 stored in the storage device 13 is appropriately referred to as a registered position.

Information regarding the relative position between the dump truck 2 and the landmark 8 detected by using the contactless sensor 24 is transmitted to the management device 10, more specifically, the processing device 12 through the communication system 9. The processing device 12 may also obtain the absolute position (GPS position) of the dump truck 2 based on the information regarding the relative position between the dump truck 2 and the landmark 8 detected by using the contactless sensor 24 and the information regarding the absolute position (GPS position) of the landmark 8 registered (stored) in the storage device 13.

The position of the landmark 8 detected by using the GPS, that is to say, the GPS position may also be stored in the storage device 25 of the dump truck 2. In this case, the processing device 20 of the dump truck 2 may obtain the absolute position (GPS position) of the dump truck 2 based on the information regarding the relative position between the dump truck 2 and the landmark 8 detected by using the contactless sensor 24 and the information regarding the absolute position (GPS position) of the landmark 8 stored in the storage device 25. As for the GPS position of the landmark 8, entire information or a part of the information stored in the storage device 13 of the management device 10 may be transmitted through the wireless communication devices 18 and 28 to the storage device 25 of the dump truck 2 to be stored. The GPS position of the landmark 8 stored in the storage device 25 of the dump truck 2 is appropriately referred to as the registered position.

When the storage device 25 of the dump truck 2 stores a part of the GPS positions of the landmarks 8 stored in the storage device 13 of the management device 10, it is not required to store the GPS positions of the landmarks 8 in an entire mine, so that a capacity of the storage device 25 may be made smaller. In this case, the management device 10 preferably transmits the GPS positions of the landmarks 8 which are present in a predetermined range around a current position of the dump truck 2 to the storage device 25 of the dump truck 2 to store. In this manner, the management system 1 may cover the GPS positions of the landmarks 8 in the entire mine while inhibiting an increase in capacity of the storage device 25 of the dump truck 2.

<Traveling Method of Dump Truck>

Next, an example of a traveling method of the dump truck 2 according to this embodiment is described. In the following description, an example in which the management device 10 illustrated in FIG. 2, more specifically, the processing device 12 manages the travel of the dump truck 2 is described. The processing device 12 transmits a travel instruction signal to the processing device 20 of the dump truck 2 illustrated in FIG. 4, more specifically, the travel control unit 20A through the communication system 9, more specifically, the wireless communication devices 18 and 28. The travel instruction signal includes an instruction value of a travel speed of the dump truck 2 and information of the travel route generated by the travel route generating unit 12B.

The travel control unit 20A of the dump truck 2 controls the travel of the dump truck 2 by controlling the dump truck 2 based on the travel instruction signal of the processing device 12 transmitted through the communication system 9. In this case, the travel control unit 20A operates at least one of the steering, the accelerator, and the brake of the dump truck 2.

An example in which the dump truck 2 travels based on the dead reckoning navigation is described. In this embodiment, the dump truck 2 travels across at least a part of the loading site LPA, the earth discharging site DPA, and the conveyance path HL along the travel route generated by the travel route generating unit 12B of the management device 10. The travel control unit 20A of the processing device 20 of the dump truck 2 allows the dump truck 2 to travel along the travel route set in advance and generated by the travel route generating unit 12B while the dead reckoning navigation.

The dead reckoning navigation is intended to mean navigation to travel while estimating a current self position of a target, the dump truck 2 in this embodiment, based on the direction (directional change amount) from a start point the longitude and latitude at which are known and the movement distance. As described above, the direction of the dump truck 2 is obtained by using the gyroscope sensor 26 mounted on the dump truck 2. The movement distance of the dump truck 2 is obtained by using the speed sensor 27 mounted on the dump truck 2.

The travel control unit 20A of the dump truck 2 which obtains the detection signal of the gyroscope sensor 26 and the detection result of the speed sensor 27 obtains the direction or the directional change amount of the dump truck 2 from the known start point based on the detection result of the gyroscope sensor 26. The travel control unit 20A obtains the movement distance of the dump truck 2 from the known start point based on the detection result of the speed sensor 27. The travel control unit 20A obtains a control amount regarding the travel of the dump truck 2 such that the dump truck 2 travels along the set travel route based on the detection result of the gyroscope sensor 26 and the detection result of the speed sensor 27. The travel control unit 20A controls at least one of the steering, the accelerator, and the brake of the dump truck 2 based on the obtained control amount to allow the dump truck 2 to travel along the above-described travel route.

In this embodiment, the travel control unit 20A of the dump truck allows the dump truck 2 to travel by the dead reckoning navigation. However, there is no limitation and it is also possible that the management device 10 illustrated in FIG. 2 allows the dump truck 2 to travel by the dead reckoning navigation, for example. In this case, the processing device 12 of the management device 10 obtains the detection signal of the gyroscope sensor 26 and the detection result of the speed sensor 27 through the communication system 9. The processing device 12 obtains the control amount regarding the travel of the dump truck 2 such that the dump truck 2 travels along the set travel route based on the detection result of the gyroscope sensor 26 and the detection result of the speed sensor 27. Next, the processing device 12 transmits the control amount obtained through the communication system 9 to the processing device 20 of the dump truck 2. The travel control unit 20A of the processing device 20 controls operation of at least one of the steering, the accelerator, and the brake of the dump truck 2 based on the control amount obtained from the processing device 12 of the management device 10 to allow the dump truck 2 to travel along the above-described travel route.

Next, an example in which the dump truck 2 travels while the self position of the dump truck 2 obtained by the dead reckoning navigation (hereinafter, appropriately referred to as estimated position) is corrected by using the GPS is described. When a travel distance of the dump truck 2 becomes longer, the error might occur between the estimated position of the dump truck 2 and the actual self position of the dump truck 2 due to accumulation of detection errors of one or both of the gyroscope sensor 26 and the speed sensor 27. As a result, the dump truck 2 might deviate from the travel route generated by the travel route generating unit 12B of the processing device 12.

In this embodiment, when the dump truck 2 travels by the dead reckoning navigation, the travel control unit 20A allows the dump truck 2 to travel while correcting the estimated position of the dump truck 2 by using the information regarding the GPS position of the dump truck 2 detected by the position detection device 29. The travel control unit 20A corrects the estimated position of the dump truck 2 based on the detection result of the gyroscope sensor 26, the detection result of the speed sensor 27, and the information regarding the GPS position of the dump truck 2 detected by the position detection device 29. The travel control unit 20A calculates the control amount regarding the travel of the dump truck 2 such that the dump truck 2 travels along the travel route by using the corrected estimated position. The travel control unit 20A controls the travel of the dump truck 2 based on the obtained control amount such that the dump truck 2 which travels by using the dead reckoning navigation travels along the travel route.

Next, an example in which the dump truck 2 travels by the dead reckoning navigation while the estimated position obtained by the dead reckoning navigation is corrected by using the landmark 8 is described. In the mine, a state in which detection accuracy (positioning accuracy) by the GPS is deteriorated and a state in which the positioning by the GPS becomes impossible might occur. For example, in the mine, when the antenna 29A cannot sufficiently receive the radio wave from the GPS satellite 5 due to an effect of an obstacle or when the number of GPS satellites 5 the radio wave from which the antenna 29A may receive is small, the state in which the detection accuracy by the GPS is deteriorated and the state in which the positioning by the GPS becomes impossible might occur.

In this embodiment, the travel control unit 20A of the dump truck 2 corrects the estimated position by using the landmark 8 when it is difficult to correct the estimated position obtained by the dead reckoning navigation by using the GPS. That is to say, when the estimated position is not corrected by using the GPS, the travel control unit 20A corrects the estimated position of the dump truck 2 obtained by the dead reckoning navigation by the relative position between the landmark 8 and the dump truck 2 detected by using the contactless sensor 24 and the registered position corresponding to the landmark 8 detected by using the contactless sensor 24.

Figure 8:
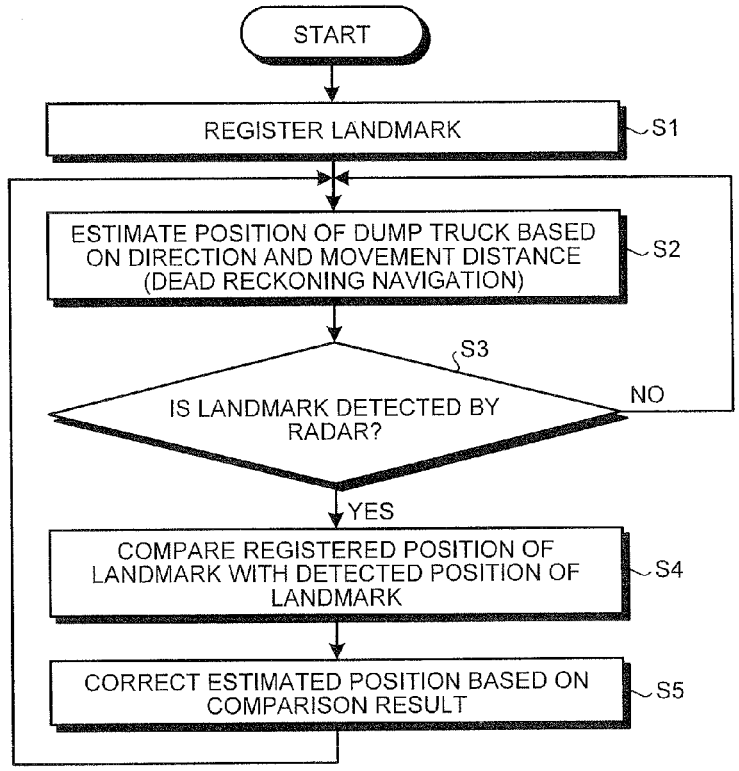
FIG. 8 is a flowchart illustrating an example of a traveling method of the dump truck including correction of an estimated position using the landmark and the contactless sensor.

FIG. 8 is a flowchart illustrating an example of the traveling method of the dump truck 2 including the correction of the estimated position by using the landmark 8 and the contactless sensor 24. In the mine, before the operation of the dump truck 2, a plurality of landmarks 8 is located on the loading site LPA, the earth discharging site DPA, and the conveyance path HL. Each of the positions (GPS positions and absolute positions) of a plurality of landmarks 8 is detected by using the GPS. The information regarding the position of the landmark 8 detected by using the GPS is stored in the storage device 13 of the management device 10 to be the registered position (step S1). In this embodiment, entire information or a part of the information regarding the positions of the landmarks 8 is transmitted through the communication system 9 to the storage device 25 included in the processing system 2S of the dump truck 2 to be stored.

The travel control unit 20A of the dump truck 2 allows the dump truck 2 to travel based on the dead reckoning navigation (step S2). While the dump truck 2 travels, the travel control unit 20A emits the radio wave from the contactless sensor 24. The detection result of the contactless sensor 24 is output to the travel control unit 20A. The travel control unit 20A determines whether the landmark 8 is detected based on the detection result of the contactless sensor 24 (step S3).

At step S3, when it is determined that the landmark 8 is not detected (step S3, No), the travel of the dump truck 2 based on the dead reckoning navigation is continued (step S2). At step S3, when it is determined that the landmark 8 is detected (step S3, Yes), the travel control unit 20A compares the position of the landmark 8 stored in the storage device 25, that is to say, the registered position with the position (measured position) of the landmark 8 detected by the contactless sensor 24 (step S4). The travel control unit 20A obtains the measured position of the landmark 8 based on the information regarding the relative position between the dump truck 2 and the landmark 8 detected by the contactless sensor 24 and the estimated position of the dump truck 2 when the contactless sensor 24 detects the landmark 8.

In this case, the travel control unit 20A extracts the information corresponding to the landmark 8 detected by the contactless sensor 24 out of the information regarding the positions of a plurality of landmarks 8 stored in the storage device 25 from the storage device 25. That is to say, the position of the landmark 8 the closest to the estimated position in the travel direction of the dump truck 2 at timing at which the contactless sensor 24 detects the landmark 8 is extracted out of the registered positions (GPS positions) of a plurality of landmarks 8 stored in the storage device 25. At step S4, the registered position of the landmark 8 extracted in this manner is compared with the measured position of the landmark 8 detected by the contactless sensor 24.

Although the registered position and the measured position of the landmark 8 are compared with each other at step S4 in this embodiment, there is no limitation. For example, it is also possible that the estimated position of the dump truck 2 and the position of the dump truck 2 obtained from the registered position of the landmark 8 may be compared with each other at step S4. In this case, the position of the dump truck 2 based on the registered position of the landmark 8 is obtained from the information regarding the relative position between the dump truck 2 and the landmark 8 detected by the contactless sensor 24 and the registered position of the landmark 8.

The travel control unit 20A corrects the estimated position of the dump truck 2 based on a result of comparison at step S4 (step S5). For example, the travel control unit 20A obtains a correction amount of the estimated position based on difference between the registered position of the landmark 8 stored in the storage device 25 and the measured position of the landmark 8 detected by the contactless sensor 24. That is to say, the travel control unit 20A obtains the control amount regarding the travel of the dump truck 2 including the above-described correction amount to correct the estimated position of the dump truck 2 based on the detection result of the gyroscope sensor 26, the detection result of the speed sensor 27, the information regarding the relative position between the dump truck 2 and the landmark 8 detected by using the contactless sensor 24, and the information regarding the position of the landmark 8 stored in the storage device 25. The travel control unit 20A controls the travel of the dump truck 2 such that the dump truck 2 travels along the travel route generated by the travel route generating unit 12B of the processing device 12 illustrated in FIG. 2 based on the instruction including the obtained correction amount and control amount.

In this embodiment, an example in which the processing device 20 of the dump truck 2 corrects the estimated position by using the GPS or the landmark 8 is described. However, there is no limitation and the management device 10 illustrated in FIG. 2 may correct the estimated position by using the GPS or the landmark 8.

<Example of Position Detecting Process and Position Registering Process of Landmark>

Next, an example of a position detecting process and a position registering process of the landmark 8 (process at step S1 in FIG. 8) is described. The position detecting process of the landmark 8 is the process of detecting the position (GPS position) of the landmark 8. Specifically, the position registering process of the landmark 8 is the process of allowing the storage device 13 (database 13B) to store the detected position of the landmark 8 or the information regarding the position to register. Meanwhile, the position of the landmark 8 may also be stored to be registered in the storage device 25 (database 25B) of the dump truck 2.

Figure 9:
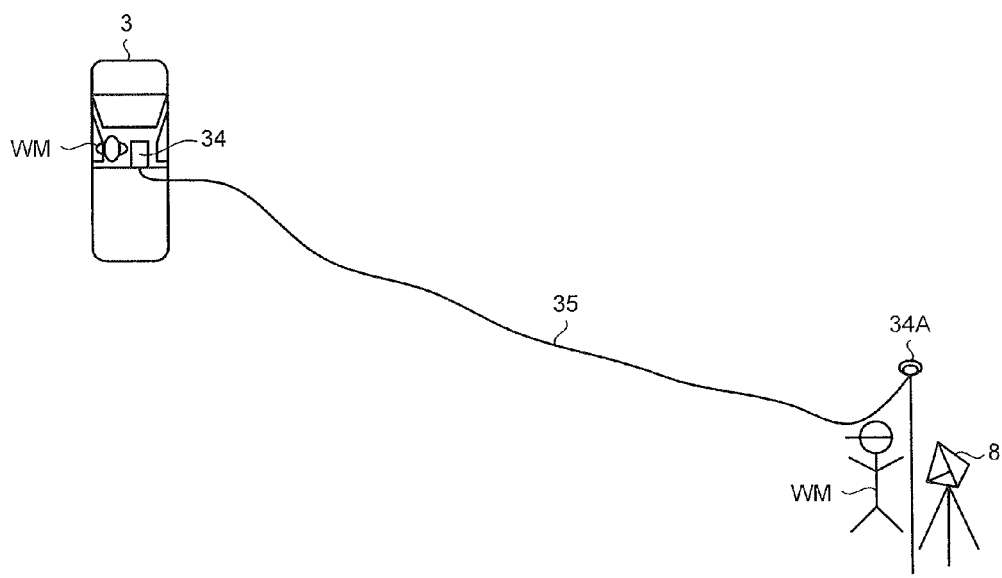
FIG. 9 is a view illustrating an example of a position detecting process and a position registering process of the landmark according to this embodiment.

FIG. 9 is a view illustrating an example of the position detecting process and the position registering process of the landmark 8 according to this embodiment. The position of the landmark 8 located in the mine is detected by using the GPS. As illustrated in FIG. 9, the position of the landmark 8 is detected by using the GPS antenna 34A.

The vehicle 3 in which the worker WM gets moves close to the landmark 8 being a target the position of which is to be detected and registered. In this case, the vehicle 3 moves close to the landmark 8 to be registered with the antenna 34A mounted thereon.

When the vehicle 3 reaches the vicinity of the landmark 8, the worker WM moves outside the vehicle 3 while holding the antenna 34A. Therefore, the antenna 34A is carried out of the vehicle 3, but the position detection device 34 is mounted on the vehicle 3. Next, as illustrated in FIG. 9, the worker WM locates the antenna 34A in the vicinity of the landmark 8 located in the mine. The antenna 34A receives the radio wave from the GPS satellite 5 in a state being arranged outside the vehicle 3.

The signal based on the radio wave from the GPS satellite 5 which the antenna 34A receives is output to the position detection device 34 through the cable 35. The position detection device 34 detects the position (GPS position) of the antenna 34A based on the signal from the antenna 34A. As illustrated in FIG. 9, the antenna 34A outputs the signal based on the radio wave from the GPS satellite 5 to the position detection device 34 in a state being located in the vicinity of the landmark 8. Therefore, the position detection device 34 obtains the GPS position of the antenna 34A, and according to this, the GPS position of the landmark 8 is obtained.

The processing device 30 of the vehicle 3 transmits information based on the signal from the antenna 34A to the wireless communication device 18 of the management device 10 by using the wireless communication device 32 mounted on the vehicle 3. In this embodiment, the information based on the signal from the antenna 34A includes the information regarding the position of the antenna 34A and the information regarding the position of the landmark 8 detected by the position detection device 34 based on the signal from the antenna 34A. Hereinafter, the information is referred to as landmark positional information. The wireless communication device 18 of the management device 10 receives the landmark positional information transmitted from the wireless communication device 32 of the vehicle 3. The processing device 12 of the management device 10 obtains the information regarding the landmark positional information transmitted from the vehicle 3 through the wireless communication device 18 and registers the same in the storage device 13 (database 133).

<Limitation of Dead Reckoning Navigation>

Figure 10:
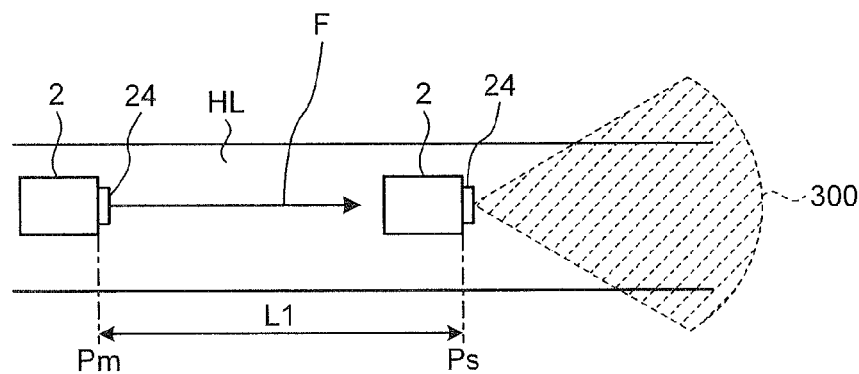
FIG. 10 is a view for illustrating limitation of a travel distance when the dump truck travels only by dead reckoning navigation.

FIG. 10 is a view for illustrating limitation of the travel distance when the dump truck 2 travels only by the dead reckoning navigation. Reference numeral F in FIG. 10 indicates the travel direction of the dump truck 2. A position Pm illustrated in FIG. 10 indicates a position where the travel only by the dead reckoning navigation is started because it becomes difficult for the dump truck 2 to correct the estimated position by using the GPS and the landmark 8. When the dump truck 2 travels only by the dead reckoning navigation, the error of the estimated position becomes larger as the travel distance becomes longer as described above. When the dump truck 2 travels by using only the dead reckoning navigation, if the landmark 8 is present in the detection area 300 of the contactless sensor 24, the travel control unit 20A may correct the estimated position by using the information regarding the position of the landmark 8. However, when the dump truck 2 continues traveling only by the dead reckoning navigation when the contactless sensor 24 cannot detect the landmark 8, the error of the estimated position becomes larger, and as a result, the dump truck 2 might deviate from the conveyance path HL.

Therefore, the travel limiting unit 20B of the dump truck 2 illustrated in FIG. 4 does not allow the dump truck 2 to travel a distance longer than a first distance L1 when this travels only by the dead reckoning navigation because it is difficult to correct the estimated position by using the GPS and the landmark 8. Therefore, when the dump truck 2 which travels only by the dead reckoning navigation travels the first distance L1, the travel limiting unit 20B stops the same. In an example illustrated in FIG. 10, the dump truck 2 which travels by using only the dead reckoning navigation stops at a position Ps. In this manner, the travel limiting unit 20B limits the travel distance of the dump truck 2 which travels only by the dead reckoning navigation.

The first distance L1 is the distance the dump truck 2 which travels only by the dead reckoning navigation can travel. That is to say, the first distance is the distance the dump truck 2 may travel without deviating from the conveyance path HL certainly by using only the dead reckoning navigation even if the errors are accumulated. The first distance L1 is determined in advance to be stored in the storage device 25 of the dump truck 2 illustrated in FIG. 4. The travel limiting unit 20B reads the first distance L1 from the storage device 25 when allowing the dump truck 2 to travel only by the dead reckoning navigation. When the distance the dump truck 2 travels from the position Pm where the travel only by the dead reckoning navigation starts reaches the first distance L1, the travel limiting unit 20B stops the dump truck 2. In this embodiment, the first distance L1 is 100 m, for example, but there is no limitation.

In the mine, when the dump truck 2 which travels along the conveyance path HL stops, the dump truck 2 cannot convey the load to the earth discharging site DPA nor move to the loading site LPA. As a result, productivity in the mine might be deteriorated. When the dump truck 2 which travels along the conveyance path HL stops, the dump truck 2 subsequent to the stopped dump truck 2 might stop also, the productivity in the mine might be further deteriorated. In this manner, when the dump truck 2 which travels by using only the dead reckoning navigation is stopped when this travels the first distance L1 or longer, the productivity in the mine might be deteriorated. It is preferable to make stop time of the dump truck 2 which travels along the conveyance path HL as short as practicable in order to inhibit the deterioration in the productivity in the mine.

<Relaxation of Limitation of Dead Reckoning Navigation>

Figure 11:
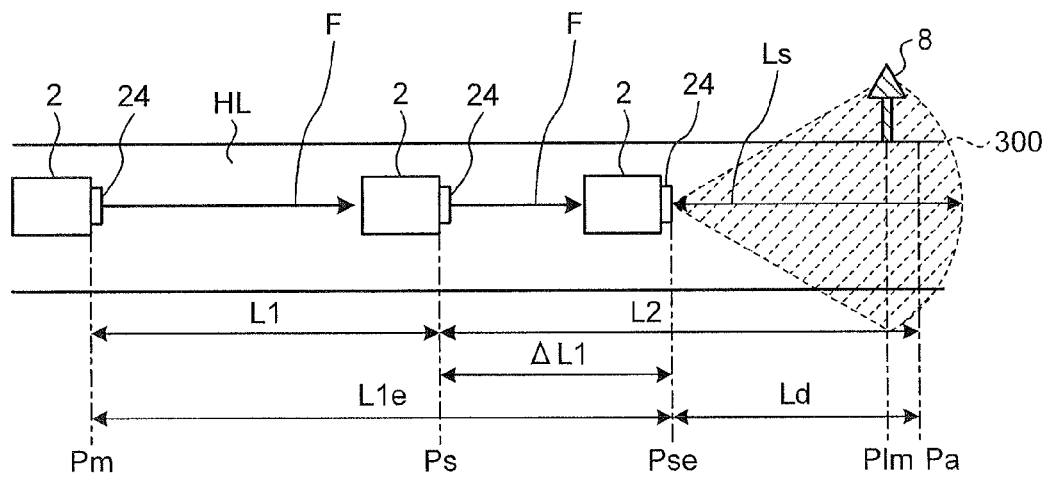
FIG. 11 is a view for illustrating relaxation of the limitation of the travel distance when the dump truck travels by the dead reckoning navigation.

FIG. 11 is a view for illustrating relaxation of the limitation of the travel distance when the dump truck 2 travels by the dead reckoning navigation. The management system 1 and a managing method of the mining machine according to this embodiment extend the first distance L1 to make the same a first distance L1e (L1e>L1) when the landmark 8 cannot be detected within the first distance L1 from the position Pm where the dump truck 2 starts traveling only by the dead reckoning navigation but the landmark 8 is present within a range of a second distance L2 in the travel direction F of the dump truck 2 from the position Ps as the reference where the dump truck 2 reaches after traveling the first distance L1 from the position Pm. In this manner, the management system 1 and the managing method of the mining machine according to this embodiment may decrease the number of times the dump truck 2 which travels by using only the dead reckoning navigation stops on the conveyance path HL or time in which this stops, so that it is possible to inhibit the deterioration in the productivity in the mine.

In an example illustrated in FIG. 11, a position Pa is a position away from the position Ps by the second distance L2 in the travel direction F of the dump truck 2, the position Ps as the reference where the dump truck 2 reaches after traveling the first distance L1 from the position Pm where this starts traveling by using only the dead reckoning navigation. In the example illustrated in FIG. 11, the landmark 8 is present at a position Plm within the range of the second distance L2 in the travel direction F of the dump truck 2 from the position Ps as the reference. That is to say, the landmark 8 is present closer to the position Ps than the position Pa. In this case, the travel limitation relaxing unit 20C changes the current first distance L1 to the longer first distance L1e. When the dump truck 2 travels by using only the dead reckoning navigation after the first distance L1 is changed to the first distance L1e, the travel limiting unit 20B stops the dump truck 2 when the dump truck 2 reaches a position Pse the changed first distance L1e from the position Pm where the dump truck 2 starts traveling by using only the dead reckoning navigation.

When the contactless sensor 24 detects the landmark 8 which is present in its own detection area 300 before the dump truck 2 reaches the position Pse, the travel control unit 20A allows the dump truck 2 to travel by using the dead reckoning navigation and the information regarding the position of the landmark 8. Specifically, the travel control unit 20A corrects the estimated position by the information regarding the position of the landmark 8 and allows the dump truck 2 to travel by using the corrected estimated position. In this manner, after the contactless sensor 24 detects the landmark 8, the travel control unit 20A may allow the dump truck 2 to travel while correcting the estimated position by the landmark 8, thereby decreasing the error of the estimated position, so that it is possible to inhibit deterioration in accuracy when the dump truck 2 is allowed to travel along the travel route set in advance.

An amount by which the first distance L1 is extended (hereinafter, appropriately referred to as extended amount) ΔL1 is obtained by subtracting L1 from L1e. The extended amount ΔL1 is not limited to a specific amount; however, when this is too large, the error of the estimated position becomes large, and when this is too small, an effect of decreasing frequency of the stop of the dump truck 2 becomes small. Therefore, the extended amount ΔL1 is preferably set as large as practicable within a range in which the error of the estimated position is allowable. For example, the extended amount ΔL1 is preferably not larger than one-fifth of the first distance L1, more preferably not larger than one-third of the first distance L1, and further preferably not larger than half the first distance L1.

When a case in which a width of the conveyance path HL is large is compared with a case in which this is small, the allowable error of the estimated position of the former may be larger than that of the latter. When a case in which the shape of the conveyance path HL is a straight line is compared with a case in which this is a curve, the error of the estimated position of the latter tends to be larger. When the shape of the conveyance path HL is the curve, the error of the estimated position tends to be larger as a curvature is smaller. Therefore, the extended amount ΔL1 may be set according to the dimension, shape and the like of the conveyance path HL, that is to say, a configuration of the conveyance path HL. In this manner, it is possible to decrease possibility that the dump truck 2 deviates from the conveyance path HL due to the error of the estimated position.

Therefore, in this embodiment, the travel limitation relaxing unit 20C may change the extended amount ΔL1 being the amount by which the first distance L1 is extended according to the error of the position, that is to say, the estimated position of the dump truck 2 occurring by the dead reckoning navigation. That is to say, the travel limitation relaxing unit 20C may change the extended amount ΔL1 according to the current position of the dump truck 2 on the conveyance path HL. As described above, the error of the estimated position differs according to at least one of the dimension and shape of the conveyance path HL along which the dump truck 2 travels. Therefore, the travel limitation relaxing unit 20C changes the extended amount ΔL1 according to at least one of the dimension and shape of the conveyance path HL as described above.

For example, since the travel route of the dump truck 2 is set in advance, the travel limitation relaxing unit 20C illustrated in FIG. 4 may change the extended amount ΔL1 based on the information of the travel route. For example, the travel limitation relaxing unit 20C obtains the dimension and shape of the travel route in the travel direction from the position Pm where the dump truck 2 starts traveling by using only the dead reckoning navigation from the information of the travel route. Next, the travel limitation relaxing unit 20C determines the extended amount ΔL1 based on the obtained dimension and shape of the travel route. For example, when the travel route in front of the position Pm is the curve, the travel control unit 20A makes a value smaller than the extended amount ΔL1 when the travel route is the straight line the extended amount ΔL1.

The second distance L2 is obtained by adding a predetermined amount Ld to the extended amount ΔL1 (L2=ΔL1+Ld). Although a predetermined amount Ld is not limited, this is made smaller than a detectable distance Ls of the contactless sensor 24 (Ld<Ls) in this embodiment. In this manner, when the landmark 8 is present within the range of the second distance L2 from the position Ps, the contactless sensor 24 of the dump truck 2 may detect the landmark 8 before the dump truck 2 travels the extended first distance L1e, that is to say, before this reaches the position Pse, so that it is preferable.

<Process of Managing Method of Mining Machine>

Figure 12:
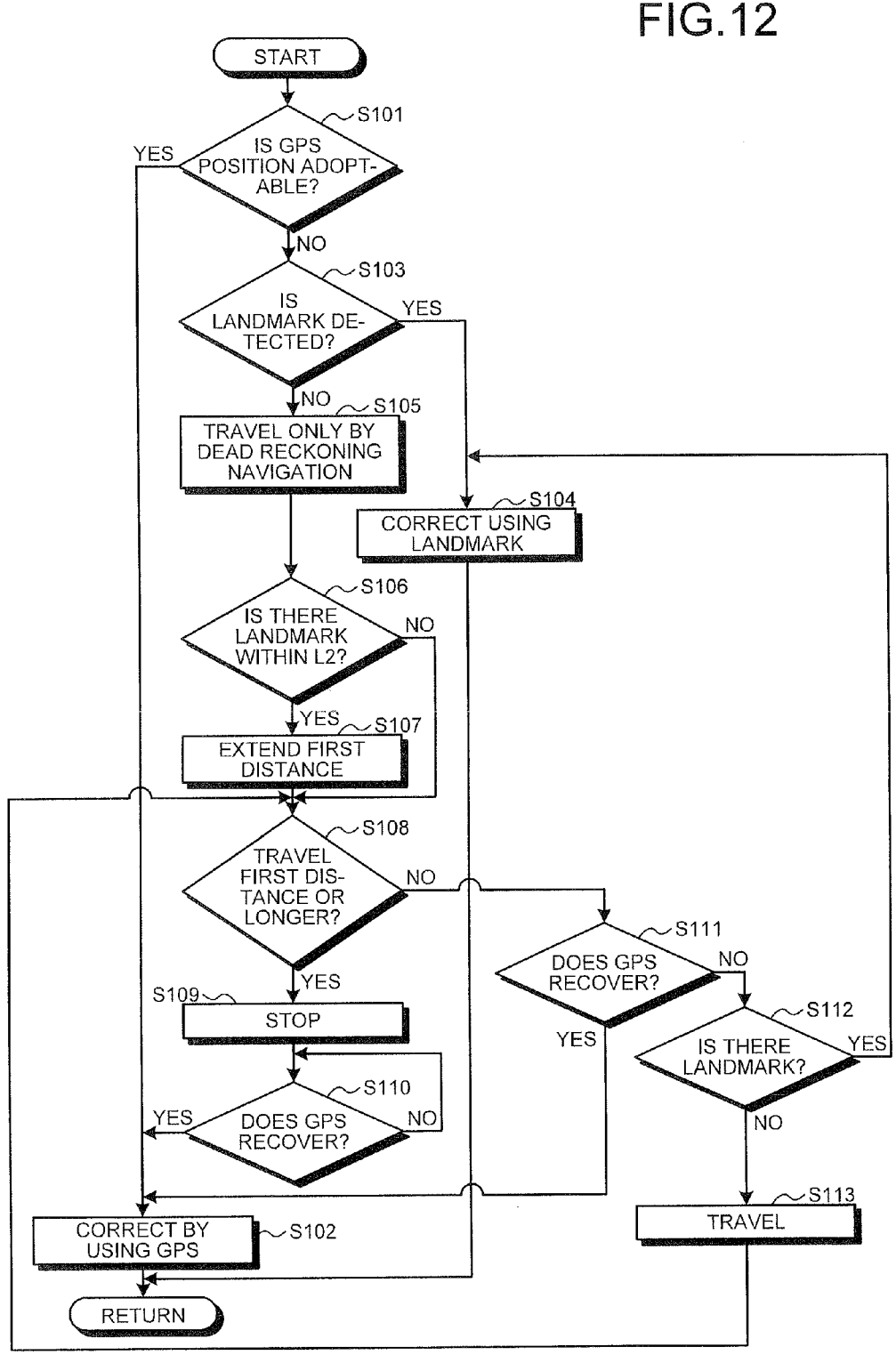
FIG. 12 is a flowchart illustrating a procedure of a managing method of the mining machine according to this embodiment.

FIG. 12 is a flowchart illustrating a procedure of the managing method of the mining machine according to this embodiment. Although the managing method of the mining machine according to this embodiment is mainly executed by the processing device 20 of the dump truck 2 illustrated in FIG. 4, this may also be mainly executed by the processing device 12 of the management device 10 illustrated in FIG. 2. At step S101, the travel control unit 20A provided in the processing device 20 of the dump truck determines whether the GPS position, that is to say, the position detected or measured by the GPS may be adopted. For example, when a detection result is not output from the position detection device 29 illustrated in FIG. 4 or when a detection state of the GPS is not excellent based on accuracy information included in the detection result output by the position detection device 29, the travel control unit 20A determines that the GPS position, that is to say, the position positioned by the GPS cannot be adopted. The information detected by the GPS preferably includes possibility of reception of the GPS radio wave or the accuracy information based on a reception state of the GPS radio wave in addition to the positional information.

When the GPS position may be adopted (step S101, Yes), the travel control unit 20A allows the dump truck 2 to travel by the dead reckoning navigation while correcting the estimated position by using the GPS at step S102. When the GPS position cannot be adopted (step S101, No), the travel control unit 20A determines whether the contactless sensor 24 of the dump truck 2 illustrated in FIG. 3 and the like detects the landmark 8 at step S103. Herein, the detection of the landmark 8 is described with reference to the flowchart illustrated in FIG. 15.

Figure 13:
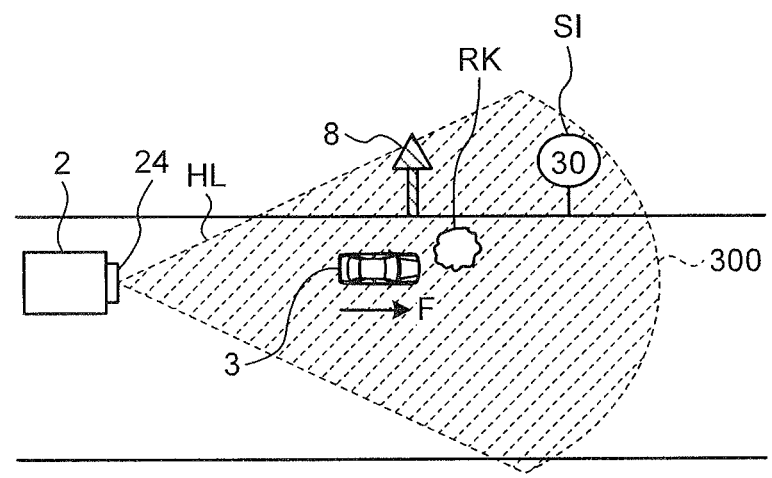
FIG. 13 is a view illustrating an example of a method of detecting the landmark.
Figure 14:
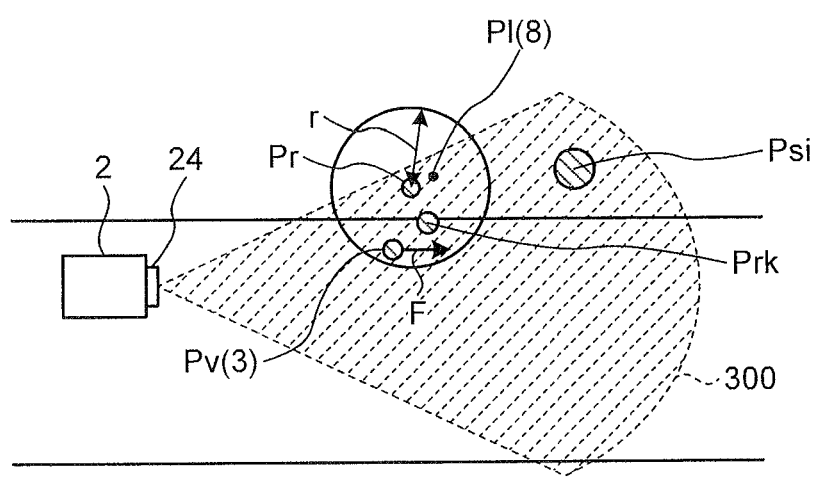
FIG. 14 is a view illustrating an example of the method of detecting the landmark.
Figure 15:
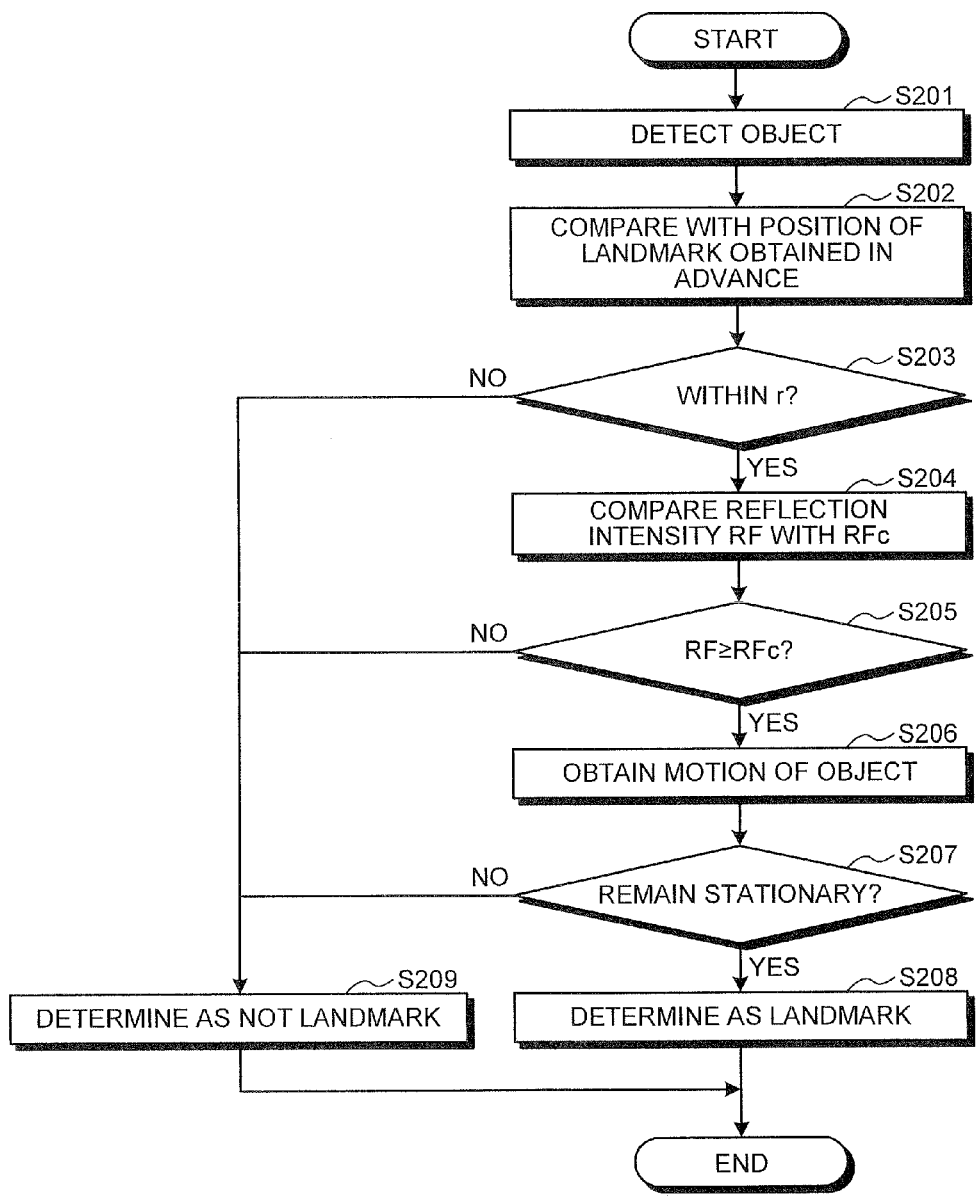
FIG. 15 is a flowchart illustrating a procedure of an example of a process of detecting the landmark.

FIGS. 13 and 14 are views illustrating an example of a method of detecting the landmark 8. FIG. 15 is the flowchart illustrating a procedure of an example of a process of detecting the landmark 8. In this embodiment, when the contactless sensor 24 detects the landmark 8, the landmark 8 is distinguished from other objects by using the reflection intensity of the object detected by the contactless sensor 24, motion of the object detected by the contactless sensor 24, and difference between the registered position of the landmark 8 and the position of the object obtained by the contactless sensor 24.

Suppose that the landmark 8, a rock RK, a sign SI, and the vehicle 3 are present in the travel direction of the dump truck 2 which travels along the conveyance path HL as illustrated in FIG. 13. They are located within the detection area 300 of the contactless sensor 24. The vehicle 3 moves in the direction indicated by arrow F. Arrow F indicates the travel direction of the vehicle 3. At step S201, when the contactless sensor 24 detects them, as illustrated in FIG. 14, the positions of the landmark 8, the rock RK, the sign SI, and the vehicle 3 are represented by Pl, Prk, Psi, and Pv, respectively. The position of the landmark 8 obtained in advance and stored in the storage device 13 of the management device 10 illustrated in FIG. 2 or the storage device 25 of the dump truck 2 illustrated in FIG. 4 to be registered is represented by Pr (hereinafter, appropriately referred to as registered landmark position Pr). When the contactless sensor 24 detects these objects as illustrated in FIG. 14, information that the objects with different reflection intensity and the moving object are present in the detection area 300 is obtained. The travel control unit 20A specifies the landmark 8 from the information by executing processes from step S202, for example. In the following description, the object detected by the contactless sensor 24 is appropriately referred to as a detected object.

Before executing the processes from step S202, the travel control unit 20A obtains the positions of the detected objects from the distance thereto and the direction thereof. The position of the detected object is the relative position with respect to the contactless sensor 24. Therefore, the travel control unit 20A obtains the absolute position of the detected object by using the position (absolute position) of the dump truck 2 when the contactless sensor 24 detects the object. Hereinafter, the positions Pl, Prk, Psi, and Pv corresponding to the landmark 8, the rock RK, the sign SI, and the vehicle 3, respectively, are the absolute positions.

At step S202, the travel control unit 20A obtains the registered landmark position Pr from the storage device 25 of the dump truck 2 illustrated in FIG. 4 and compares the same with the absolute position of the detected object. The registered landmark position Pr is the GPS position and absolute position. The travel control unit 20A compares at step S202 and shifts the procedure to step S203. At step S203, when distances between the absolute positions of the detected objects and the registered landmark position Pr are not longer than a predetermined threshold r (step S203, Yes), the travel control unit 20A executes the process at step S204 on the detected objects. A predetermined threshold r is used for distinguishing the landmark 8. In the example illustrated in FIG. 14, the distances from the registered landmark position Pr to the positions Pl, Prk, and Pv are not longer than a predetermined threshold r. Therefore, the travel control unit 20A executes the process at step S204 on them.

At step S204, the travel control unit 20A compares reflection intensity RF of the detected objects at the positions Pl, Prk, and Pv with a threshold RFc of the reflection intensity determined in advance. The threshold RFc of the reflection intensity is used for excluding the object the reflection intensity of which is low such as the rock when specifying the landmark 8 from the detected objects. The threshold RFc of the reflection intensity is determined so as to achieve this object. The travel control unit 20A compares at step S204 and shifts the procedure to step S205.

When the detected object the reflection intensity RF of which is not smaller than the threshold RFc of the refection intensity (RF≥RFc) is present at step S205 (step S205, Yes), the travel control unit 20A executes the process at step S206 on such detected object. In the example illustrated in FIG. 14, suppose that the reflection intensity RF of the detected objects corresponding to the positions Pl and Pv is not smaller than the threshold RFc of the reflection intensity and the reflection intensity RF of the detected object corresponding to the position Prk is smaller than the threshold RFc of the reflection intensity. Therefore, the travel control unit 20A executes the process at step S206 on the detected objects corresponding to the positions Pl and Pv.

At step S206, the travel control unit 20A obtains the motion of the detected objects corresponding to the positions Pl and Pv. For example, when change in the positions Pl and Pv obtained at different times is not smaller than a predetermined value, the travel control unit 20A determines that the detected objects corresponding to the positions move, and when the change is smaller than a predetermined value, this determines that the detected objects corresponding to the positions remain stationary. The landmark 8 is a stationary structure, so that the moving detected object is not the landmark 8. The travel control unit 20A compares at step S206 and shifts the procedure to step S207.

At step S207, when the detected object remains stationary (step S207, Yes), the travel control unit 20A determines that the detected object is the landmark 8 at step S208. In the example illustrated in FIG. 14, the detected object corresponding to the position Pl remains stationary and the detected object corresponding to the position Pv moves in the travel direction F. Therefore, the detected object corresponding to the position Pl is the landmark 8. The position Pl becomes the absolute position of the landmark 8.

When the distance between the registered landmark position Pr and the absolute position of the detected object is larger than a predetermined threshold r (step S203, No), when the detected object the reflection intensity RF of which is smaller than the threshold RFc of the reflection intensity (RF<RFc) is present (step S205, No), and when the detected object moves (step S207, No), the travel control unit 20A determines that such detected objects are not the landmark 8 at step S209. The travel control unit 20A specifies the landmark 8 from the objects detected by the contactless sensor 24 by executing such processes, and according to this, the landmark 8 is detected by the contactless sensor 24.

Returning to step S103, when the contactless sensor 24 detects the landmark 8 (step S103, Yes), the travel control unit 20A allows the dump truck 2 to travel by the dead reckoning navigation while correcting the estimated position by using the position of the landmark 8 at step S104. When the contactless sensor 24 does not detect the landmark 8 (step S103, No), the travel control unit 20A allows the dump truck 2 to travel by using only the dead reckoning navigation at step S105.

The procedure shifts to step S106, and the travel control unit 20A determines whether the landmark 8 is present within the range of the second distance L2 in the travel direction of the dump truck 2 from the position Ps as the reference where the dump truck 2 reaches after traveling the first distance L1 after starting traveling only by the dead reckoning navigation. When determining this, the travel control unit 20A obtains the position Ps where the dump truck 2 reaches after traveling the first distance L1 from the position Pm based on the position Pm where this starts traveling only by the dead reckoning navigation and the travel direction of the dump truck 2. Next, the travel control unit 20A determines whether the registered landmark 8 is present within the range of the second distance L2 from the position Ps in the travel direction of the dump truck 2 when the dump truck 2 starts traveling only by the dead reckoning navigation. In this case, the travel control unit 20A determines the presence of the registered landmark 8 by comparing the position (GPS position and absolute position) of the landmark 8 registered in the database 25B with the position within the range of the second distance L2 from the position Ps.

Although the position Ps where the dump truck 2 reaches after traveling the first distance L1 after starting traveling only by the dead reckoning navigation is made the reference in the above-described example, the travel control unit 20A may also determine whether the landmark 8 is present within a range of L1+L2 from Pm when the position Pm where the dump truck 2 starts traveling only by the dead reckoning navigation is made the reference. In this case, the travel control unit 20A determines the presence of the registered landmark 8 by comparing the position Pr of the landmark 8 registered in the database 25B with the position within the range of L1+L2 from the position Pm.

When the landmark 8 is present within the range of the second distance L2 (step S106, Yes), the travel limitation relaxing unit 20C extends the current first distance L1 at step S107. The extended first distance L1e is a value obtained by adding the extended amount ΔL1 to the first distance L1 before being extended. The travel control unit 20A rewrites the current first distance L1 stored in the storage device 25 of the dump truck 2 with the extended first distance L1e.

In this embodiment, the extended first distance L1e may also be stored in the storage device 25 of the dump truck 2 as a constant value. It is also possible that the storage device 25 of the dump truck 2 stores the first distance L1 before being extended as an initial value, and the travel limitation relaxing unit 20C obtains the extended amount ΔL1 according to the dimension, shape and the like of the conveyance path HL and adds the obtained extended amount ΔL1 to the first distance L1 before being extended read from the storage device 25, thereby obtaining the extended first distance L1e. Furthermore, it is also possible that the extended first distance L1e is obtained according to the dimension, shape and the like of the conveyance path HL to be stored in the storage device 25 of the dump truck 2, and the travel limitation relaxing unit 20C reads the corresponding extended first distance L1e from the storage device 25 according to the dimension, shape and the like of the conveyance path HL. In this manner, the extended first distance L1e may be set to a value according to the dimension, shape and the like of the conveyance path HL, so that possibility that the dump truck 2 traveling by using only the dead reckoning navigation deviates from the conveyance path HL due to the accumulation of the errors of the estimated position may be decreased.

When the landmark 8 is not present within the range of the second distance L2 (step S106, No), the travel control unit 20A does not execute the process at step S107 described above but executes a process at step S108 to be described next. That is to say, the travel control unit 20A does not extend the current first distance L1. In this case, when the landmark 8 is not present within the range of the second distance L2 (step S106, No), the current first distance L1 stored in the storage device 25 of the dump truck 2 is not rewritten with the extended first distance L1e. When the landmark 8 is not present within the range of the second distance L2, the first distance L1 is not extended for the dump truck 2 traveling by using only the dead reckoning navigation, so that the possibility that the dump truck 2 traveling by using only the dead reckoning navigation deviates from the conveyance path HL may be decreased.

At step S108, the travel control unit 20A determines whether the dump truck 2 travels the first distance L1 or longer from the position Pm where this starts traveling only by the dead reckoning navigation. In the determination at step S108, when the landmark 8 is present within the range of the second distance L2, the extended first distance L1e is used as the first distance L1, and when the landmark 8 is not present within the range of the second distance L2, the first distance L1 before being extended is used.

When the dump truck 2 travels the first distance L1 or longer from the position Pm (step S108, Yes), the travel limiting unit 20B stops the dump truck 2 at step S109. In this manner, the travel limiting unit 20B may inhibit the accumulation of the errors of the estimated position when the dump truck 2 is allowed to travel by using only the dead reckoning navigation. Next, the procedure shifts to step S110 and the travel control unit 20A determines whether the GPS position recovers, that is to say, whether the GPS position being the position positioned by the GPS may be adopted.

When the GPS recovers (step S110, Yes), the procedure shifts to step S102 and the travel control unit 20A allows the dump truck 2 to travel by the dead reckoning navigation while correcting the estimated position by using the GPS. At that time, when the extended first distance L1e is stored in the storage device 25 of the dump truck 2, the travel control unit 20A rewrites the same with the first distance L1 before being extended. When the GPS does not recover (step S110, No), the procedure shifts to step S110 and the travel control unit 20A waits for the GPS to recover. That is to say, the travel control unit 20A stops the dump truck 2 until the GPS recovers after the dump truck 2 traveling by using only the dead reckoning navigation travels the first distance L1 or the extended first distance L1e. Therefore, the accumulation of the errors of the estimated position is inhibited.

Next, it is described returning to step S108. When the dump truck 2 does not travel the first distance L1 or longer from the position Pm (step S108, No), it is determined whether the GPS position recovers at step S111. When the GPS recovers (step S111, Yes), the procedure shifts to step S102 and the travel control unit 20A allows the dump truck 2 to travel by the dead reckoning navigation while correcting the estimated position by using the GPS. When the extended first distance L1e is stored in the storage device 25 of the dump truck 2, the travel control unit 20A rewrites the same with the first distance L1 before being extended.

When the GPS does not recover (step S111, No), the procedure shifts to step S112 and the travel control unit 20A determines whether the contactless sensor 24 of the dump truck 2 detects the landmark 8. When the contactless sensor 24 detects the landmark 8 (step S112, Yes), the travel control unit 20A allows the dump truck 2 to travel by the dead reckoning navigation while correcting the estimated position by using the position of the landmark 8 at step S104. At that time, when the extended first distance L1e is stored in the storage device 25 of the dump truck 2, the travel control unit 20A rewrites the same with the first distance L1 before being extended.

When the contactless sensor 24 does not detect the landmark 8 (step S112, No), the travel control unit 20A allows the dump truck 2 to travel at step S113. That is to say, the travel control unit 20A allows the dump truck 2 to travel until the dump truck 2 traveling by using only the dead reckoning navigation travels the first distance L1 or the extended first distance L1e.

In this manner, the management system 1 and the managing method of the mining machine according to this embodiment extend the first distance L1 when the landmark 8 is present beyond the first distance L1 and within the range of the second distance L2 if the dump truck 2 travels by using only the dead reckoning navigation. In this manner, the management system 1 and the managing method of the mining machine according to this embodiment may allow the dump truck 2 to travel by using only the dead reckoning navigation beyond the first distance L1, so that it is possible to inhibit the deterioration in the productivity in the mine. Order of the processes from step S101 to step S113 and the order of processes from step S201 to step S208 described above may be appropriately changed.

Figure 16:
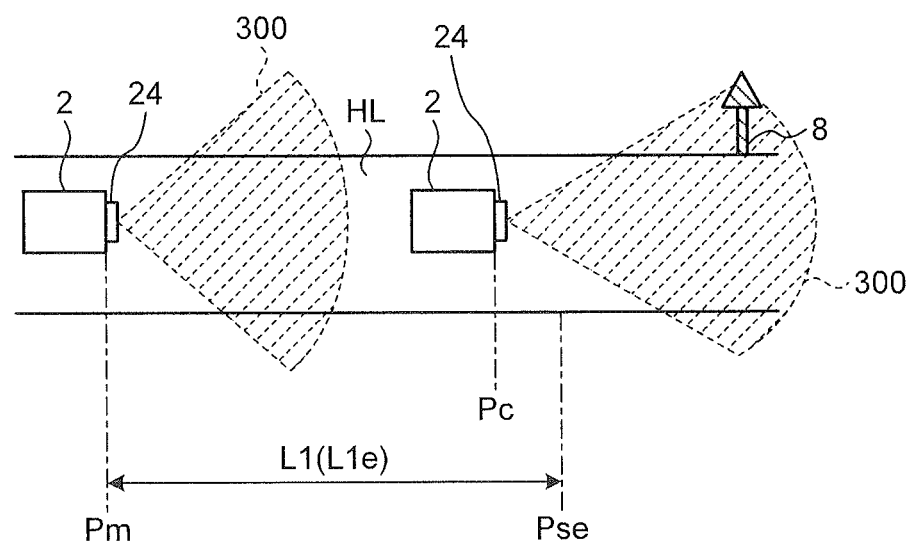
FIG. 16 is a view for illustrating an example of changing a vehicle speed of the dump truck when the dump truck travels by using only the dead reckoning navigation.

FIG. 16 is a view for illustrating an example of changing the vehicle speed of the dump truck 2 when the dump truck 2 travels by using only the dead reckoning navigation. In this embodiment, the travel control unit 20A decreases the vehicle speed as the travel distance of the dump truck 2 becomes longer when the dump truck 2 travels by using only the dead reckoning navigation. In this manner, the travel distance of the dump truck 2 per unit time becomes shorter, so that the accumulation of the errors of the estimated position per unit time may be inhibited. As a result, it is possible to inhibit the deterioration in accuracy in the dead reckoning navigation. The travel control unit 20A also has an advantage of easily stopping the dump truck 2.

In the example illustrated in FIG. 16, the dump truck 2 which travels along the conveyance path HL starts traveling by using only the dead reckoning navigation at the position Pm. When the dump truck 2 starts traveling by using only the dead reckoning navigation, the travel control unit 20A decreases the vehicle speed of the dump truck 2 as compared with that before the travel by using only the dead reckoning navigation. In this case, the travel control unit 20A increases a decreasing amount of the vehicle speed of the dump truck 2 according to travel time or the travel distance of the dump truck 2. That is to say, the vehicle speed of the dump truck 2 decreases as the travel time elapses or the travel distance becomes longer. In this case, the vehicle speed of the dump truck 2 may gradually decrease or continuously decrease.

In this embodiment, in a case in which the dump truck 2 travels by using only the dead reckoning navigation, when the contactless sensor 24 of the dump truck 2 detects the position of the landmark 8 in the travel direction of the dump truck 2, the travel control unit 20A increases the vehicle speed of the dump truck 2 as compared with that before the landmark 8 is detected. When the dump truck 2 travels by using only the dead reckoning navigation, if the landmark 8 may be detected, the estimated position may be corrected by using the position of the landmark 8. Therefore, the travel control unit 20A may inhibit the deterioration in the productivity in the mine by increasing the vehicle speed of the dump truck 2 after the landmark 8 is detected.

In the example illustrated in FIG. 16, the contactless sensor 24 of the dump truck 2 which starts traveling only by the dead reckoning navigation at the position Pm detects the landmark 8 within the detection area 300 at a position Pc before traveling the first distance L1 (or extended first distance L1e). In this case, the vehicle speed of the dump truck 2 gradually decreases from the position Pm to the position Pc, but the vehicle speed increases beyond the position Pc. Beyond the position Pc, the travel control unit 20A increases the vehicle speed of the dump truck 2 until reaching the instruction value of the vehicle speed from the management device 10, and after reaching the above-described instruction value, this controls such that the vehicle speed of the dump truck 2 is maintained at the above-described instruction value.

Although this embodiment is described above, this embodiment is not limited by the above-described contents. The components of the above-described embodiment include the component easily conceived of by one skilled in the art, the substantially same component, a so-called equivalent component. Furthermore, the above-described components may be appropriately combined. It is also possible to variously omit, replace and change the components without departing from the gist of this embodiment. Although an example of automatic travel using the GPS together is described as this embodiment, this may also be applied to the system without using the GPS. In this case, steps S101, S102, S110, and S111 are omitted from the flowchart illustrated in FIG. 12. The process at step S103 is executed from start, and when it is determined No at step S108, the procedure may shift to step S112.

REFERENCE SIGNS LIST

1 MANAGEMENT SYSTEM
2 DUMP TRUCK
2S PROCESSING SYSTEM
3 VEHICLE
3S CONTROL SYSTEM
4 LOADING MACHINE
7 CONTROL FACILITY
8 LANDMARK
8R REFLECTING PORTION
9 COMMUNICATION SYSTEM
10 MANAGEMENT DEVICE
12 PROCESSING DEVICE
12A DATA PROCESSING UNIT
12B TRAVEL ROUTE GENERATING UNIT
13 STORAGE DEVICE
13B DATABASE
18 WIRELESS COMMUNICATION DEVICE
18A ANTENNA
20 PROCESSING DEVICE
20A TRAVEL CONTROL UNIT
20B TRAVEL LIMITING UNIT
20C TRAVEL LIMITATION RELAXING UNIT
24 CONTACTLESS SENSOR
25 STORAGE DEVICE
25B DATABASE
26 GYROSCOPE SENSOR
27 SPEED SENSOR
28 WIRELESS COMMUNICATION DEVICE
28A ANTENNA
29 POSITION DETECTION DEVICE
29A ANTENNA
300 DETECTION AREA
HL CONVEYANCE PATH
L1L1e FIRST DISTANCE
L2 SECOND DISTANCE
ΔL1 EXTENDED AMOUNT

The invention claimed is:

1. A management system of a mining machine comprising:
a detecting unit mounted on the mining machine which travels in an unmanned state in a mine in which a plurality of landmarks is located, the detecting unit detecting a position of a landmark relative to the mining machine in a contactless manner;
a travel control unit which corrects a current position of the mining machine based on a position of the landmark obtained in advance and the position of the landmark obtained by the detecting unit and allows the mining machine to travel by dead reckoning navigation;
a travel limiting unit which stops the mining machine when the mining machine travels a first distance after starting traveling by the dead reckoning navigation; and
a travel limitation relaxing unit which extends the first distance when the position of the landmark obtained in advance is present within a range of a second distance in a travel direction of the mining machine from a position, as a reference, where the mining machine reaches when the mining machine travels the first distance after the mining machine starts traveling by the dead reckoning navigation.

2. The management system of the mining machine according to claim 1, comprising: a self position detection device mounted on the mining machine which obtains a self position of the mining machine, wherein the travel control unit allows the mining machine to travel by using at least the self position detected by the self position detection device and allows the mining machine to travel by the dead reckoning navigation when the self position detection device becomes unable to detect the self position.

3. The management system of the mining machine according to claim 2, wherein
the travel limiting unit makes a position where the self position detection device becomes unable to detect the self position the position where the mining machine starts traveling by the dead reckoning navigation.

4. The management system of the mining machine according to claim 2, wherein the travel control unit decreases a speed of the mining machine as compared with the speed before the dead reckoning navigation is used when the mining machine is allowed to travel by using the dead reckoning navigation.

5. The management system of the mining machine according to claim 4, wherein the travel control unit increases a decreasing amount of the speed of the mining machine according to travel time or a travel distance of the mining machine when the mining machine is allowed to travel by using the dead reckoning navigation.

6. The management system of the mining machine according to claim 4, wherein the travel control unit increases the speed of the mining machine when the detecting unit detects the position of the landmark when allowing the mining machine to travel by using the dead reckoning navigation.

7. The management system of the mining machine according to claim 1, wherein the travel limitation relaxing unit changes an amount by which the first distance is extended according to an error of the position of the mining machine occurring by the dead reckoning navigation.

8. The management system of the mining machine according to claim 1, wherein the travel limitation relaxing unit sets an amount by which the first distance is extended according to a configuration of a conveyance path along which the mining machine travels.

9. The management system of the mining machine according to claim 1, wherein the travel limitation relaxing unit changes an amount by which the first distance is extended according to a current position of the mining machine on a conveyance path along which the mining machine travels.

10. A management system of a mining machine comprising:
a detecting unit mounted on the mining machine which travels in an unmanned state in a mine in which a plurality of landmarks is located, the detecting unit detecting a position of a landmark relative to the mining machine in a contactless manner;
a self position detection device mounted on the mining machine which obtains a self position of the mining machine;
a travel control unit mounted on the mining machine which allows the mining machine to travel by using at least the self position detected by the self position detection device, and corrects a current position of the mining machine based on a position of the landmark obtained in advance and the position of the landmark obtained by the detecting unit when the self position detection device becomes unable to detect the self position to allow the mining machine to travel by dead reckoning navigation;
a travel limiting unit mounted on the mining machine which stops the mining machine when the mining machine travels a first distance after starting traveling by the dead reckoning navigation; and
a travel limitation relaxing unit mounted on the mining machine which extends the first distance when the position of the landmark obtained in advance is present within a range of a second distance in a travel direction of the mining machine from a position, as a reference, where the mining machine reaches when the mining machine travels the first distance after the mining machine starts traveling by the dead reckoning navigation.

11. A managing method of a mining machine comprising:
detecting a position of a landmark; and
extending a first distance when a position of the landmark obtained in advance is present within a range of a second distance in a travel direction of the mining machine from a position, as a reference, where the mining machine reaches when the mining machine travels the first distance after the mining machine starts traveling by the dead reckoning navigation,
when the mining machine travels in an unmanned state in a mine in which a plurality of the landmarks is located, the mining machine travels based on a detected self position and uses the dead reckoning navigation while correcting a current position of the mining machine based on a position of the landmark obtained in advance and a detected position of the landmark when the self position cannot be detected.

* * * * *